US012811338B2

(12) United States Patent
Ishii

(10) Patent No.: US 12,811,338 B2
(45) Date of Patent: Nov. 24, 2026

(54) CONNECTOR AND CABLE CONNECTOR COMPRISING CONNECTOR AND CABLE

(71) Applicant: Japan Aviation Electronics Industry, Limited, Tokyo (JP)

(72) Inventor: Kazuki Ishii, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 344 days.

(21) Appl. No.: 18/645,665

(22) Filed: Apr. 25, 2024

(65) Prior Publication Data

US 2024/0413571 A1 Dec. 12, 2024

(30) Foreign Application Priority Data

Jun. 12, 2023 (JP) ................................ 2023-096395

(51) Int. Cl.
*H01R 13/58* (2006.01)

(52) U.S. Cl.
CPC ................................ *H01R 13/5808* (2013.01)

(58) Field of Classification Search
CPC .............. H01R 13/5808; H01R 9/0518; H01R 4/184; H01R 13/6593; H01R 13/65914; H01R 4/20
See application file for complete search history.

(56) References Cited

U.S. PATENT DOCUMENTS 6,808,417 B2 * 10/2004 Yoshida ............ H01R 13/6473 439/585
9,673,578 B1 * 6/2017 Lane ................... H01R 13/631
2003/0060084 A1 3/2003 Aoki
2006/0089046 A1 * 4/2006 Annequin ............ H01R 43/048 439/578
2010/0075528 A1 * 3/2010 Ngo ....................... H01R 4/183 439/372
2019/0280398 A1 * 9/2019 Xu ......................... H01R 4/184
(Continued)

FOREIGN PATENT DOCUMENTS

JP 2021-086677 A 6/2021
JP 2022-169146 A 11/2022

OTHER PUBLICATIONS

Extended European Search Report in EP 24173856.6 dated Oct. 16, 2024.

*Primary Examiner* — Abdullah A Riyami
*Assistant Examiner* — Nelson R. Burgos-Guntin
(74) *Attorney, Agent, or Firm* — Collard & Roe, P.C.

(57) ABSTRACT

A connector comprises a connector body and a sleeve. The connector body has a body and a barrel. The barrel is located rearward of the body. The sleeve has a main portion and a projecting portion. When the connector is under an attached state where the connector is attached to the cable, the main portion encloses the cable in a perpendicular plane perpendicular to a front-rear direction and is fixed to the cable. The projecting portion extends forward from the main portion and has a stopper. The stopper is located forward of the main portion. The stopper is located outward of the main portion in the perpendicular plane when the connector is under the attached state. When the connector is under the attached state, the barrel encloses the main portion in the perpendicular plane and is fixed to the main portion, and the stopper is located forward of the barrel.

10 Claims, 17 Drawing Sheets

(56) References Cited

U.S. PATENT DOCUMENTS

| | | | | |
|---|---|---|---|---|
| 2019/0288464 | A1* | 9/2019 | Annequin | H01R 4/12 |
| 2021/0057853 | A1* | 2/2021 | Droesbeke | H01R 4/72 |
| 2021/0066856 | A1* | 3/2021 | Droesbeke | H01R 13/6593 |
| 2022/0255270 | A1* | 8/2022 | Maesoba | H01R 4/184 |
| 2022/0255273 | A1* | 8/2022 | Kumamoto | H01R 24/40 |
| 2022/0263254 | A1* | 8/2022 | Romand | H01R 43/20 |
| 2022/0263264 | A1* | 8/2022 | Hibino | H01R 13/52 |
| 2023/0092528 | A1* | 3/2023 | Perry | H01R 9/0515 439/578 |

* cited by examiner

CONNECTOR AND CABLE CONNECTOR COMPRISING CONNECTOR AND CABLE

CROSS REFERENCE TO RELATED APPLICATIONS

This application is based on and claims priority under 35 U.S.C. § 119 to Japanese Patent Application No. JP 2023-096395 filed Jun. 12, 2023, the content of which is incorporated herein in its entirety by reference.

BACKGROUND OF THE INVENTION

This invention relates to a connector configured to be attached to a cable.

For example, this type of connector is disclosed in JP2021-086677A (Patent Document 1), the content of which is incorporated herein by reference.

Referring to FIG. 30, Patent Document 1 discloses a connector 90 which is attached to a cable 98. The connector 90 comprises a sleeve 96 and a shield shell 92 which has a crimping-braid piece (barrel) 94. Referring to FIG. 31, the cable 98 comprises a braid 984 and a sheath 982 which covers the braid 984. The braid 984 has an end portion exposed from the sheath 982. The sleeve 96 is crimped onto the braid 984. Referring to FIG. 32, the end portion of the braid 984 is folded back and covers the sleeve 96. Referring to FIG. 30, a part of the barrel 94 is crimped onto the braid 984 which covers the sleeve 96. As a result, the braid 984 is electrically connected with the shield shell 92 via the sleeve 96.

In general, the sleeve 96 is crimped onto the cable 98 with a large force to be securely fixed to the cable 98. In contrast, if the barrel 94 is crimped onto the sleeve 96 with a large force, electrical connection problems might sometimes occur. Accordingly, the barrel 94 is crimped with a relatively small force. According to this crimping manner, when the cable 98 is pulled hard, the barrel 94 might be deformed so as to open, and thereby the sleeve 96 might be moved together with the cable 98 and might be displaced relative to the barrel 94. However, referring to FIG. 31, the sleeve 96 has a cylindrical body 962 and a projecting piece (projecting portion) 964. The projecting portion 964 is provided on an outer surface of the body 962 and projects outward from the body 962. Referring to FIG. 30, even when the barrel 94 is deformed so as to open because of a force applied to the cable 98, and even when the sleeve 96 and the cable 98 are moved rightward in FIG. 30, the projecting portion 964 is brought into abutment with an end portion of the barrel 94, and this abutment stops the movement of the cable 98. Thus, the displacement of the sleeve 96 relative to the barrel 94 is reduced.

However, because the projecting portion of Patent Document 1 projects outward from the outer surface of the sleeve, the barrel might be unintentionally crimped on the projecting portion. When the barrel is crimped on the projecting portion, the barrel might be insufficiently fixed around the sleeve. In addition, the projecting portion might be damaged when the projecting portion receives a force during a crimping process of the barrel.

SUMMARY OF THE INVENTION

It is therefore an object of the present invention to provide a connector with a structure which can reduce displacement of a sleeve relative to a barrel and which can prevent a damage of the sleeve when the barrel is crimped thereon.

An aspect of the present invention provides a connector configured to be attached to a front end of a cable in a front-rear direction. The connector comprises a connector body and a sleeve. The connector body has a body and a barrel. The barrel is located rearward of the body. The sleeve has a main portion and a projecting portion. When the connector is under an attached state where the connector is attached to the cable, the main portion encloses the cable in a perpendicular plane perpendicular to the front-rear direction and is fixed to the cable. The projecting portion extends forward from the main portion and has a stopper. The stopper is located forward of the main portion. The stopper is located outward of the main portion in the perpendicular plane when the connector is under the attached state. When the connector is under the attached state, the barrel encloses the main portion in the perpendicular plane and is fixed to the main portion, and the stopper is located forward of the barrel.

Another aspect of the present invention provides a cable connector comprising a connector and a cable. The connector is attached to a front end of the cable in a front-rear direction. The connector comprises a connector body and a sleeve. The connector body has a body and a barrel. The barrel is located rearward of the body. The sleeve has a main portion and a projecting portion. The main portion encloses the cable in a perpendicular plane perpendicular to the front-rear direction and is fixed to the cable. The projecting portion extends forward from the main portion and has a stopper. The stopper is located forward of the main portion and is located outward of the main portion in the perpendicular plane. The barrel encloses the main portion in the perpendicular plane and is fixed to the main portion. The stopper is located forward of the barrel.

According to the sleeve of an aspect of the present invention, the projecting portion does not project outward from an outer surface of the main portion but extends forward from the main portion. The stopper of the projecting portion is located forward of the main portion and the barrel and projects outward beyond the outer surface of the main portion. The thus-formed stopper can reduce displacement of the sleeve. Moreover, even when the barrel is crimped on the stopper, the stopper is moved toward the cable, and thereby the projecting portion can be prevented from being damaged. Thus, an aspect of the present invention provides the connector with a structure which can reduce displacement of the sleeve relative to the barrel and which can prevent the sleeve from being damaged when the barrel is crimped.

An appreciation of the objectives of the present invention and a more complete understanding of its structure may be had by studying the following description of the preferred embodiment and by referring to the accompanying drawings.

Figure 1:
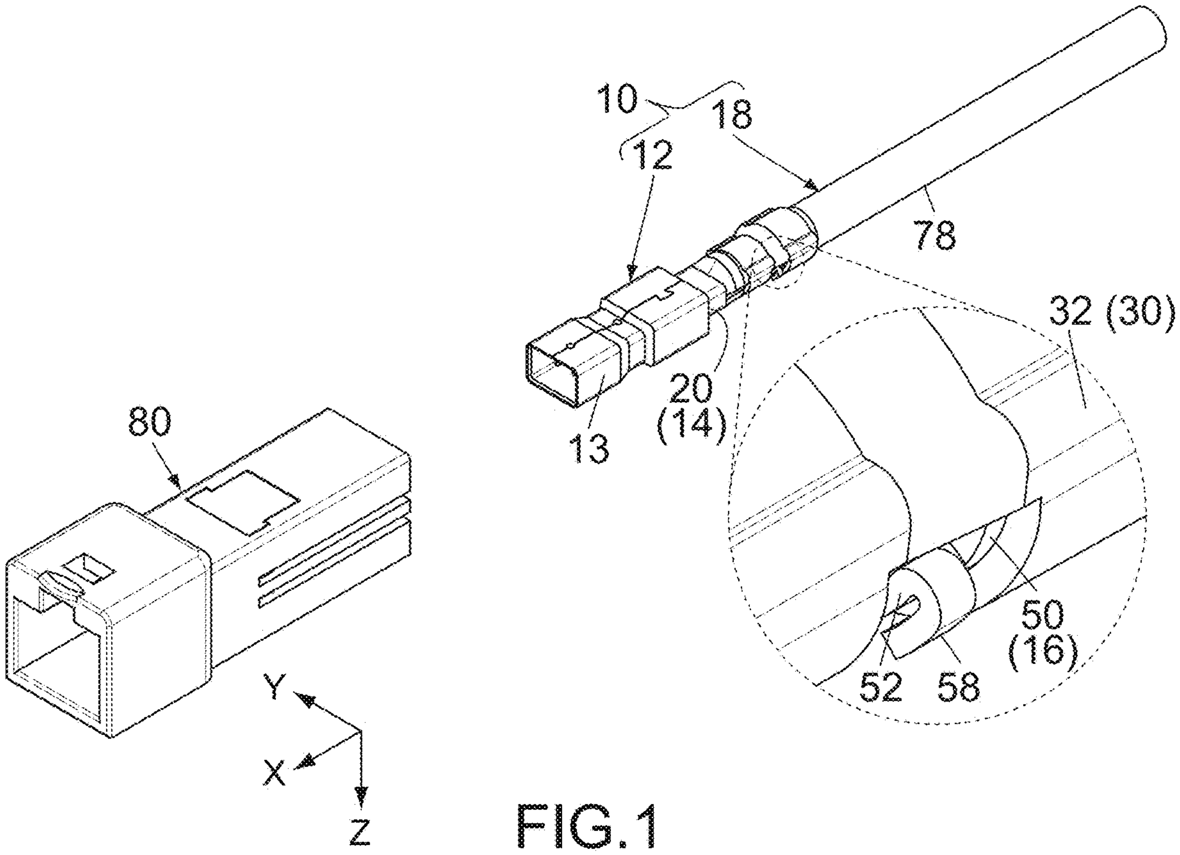
FIG. 1 is a perspective view showing a cable connector according to an embodiment of the present invention together with an object, wherein a part of the cable connector enclosed by dashed line is enlarged and illustrated.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

As shown in FIG. 1, a cable connector 10 according to an embodiment of the present invention comprises a connector 12 and a cable 18. The connector 12 is attached to the cable 18. Thus, the connector 12 of the present embodiment is configured to be attached to the cable 18.

Figure 2:
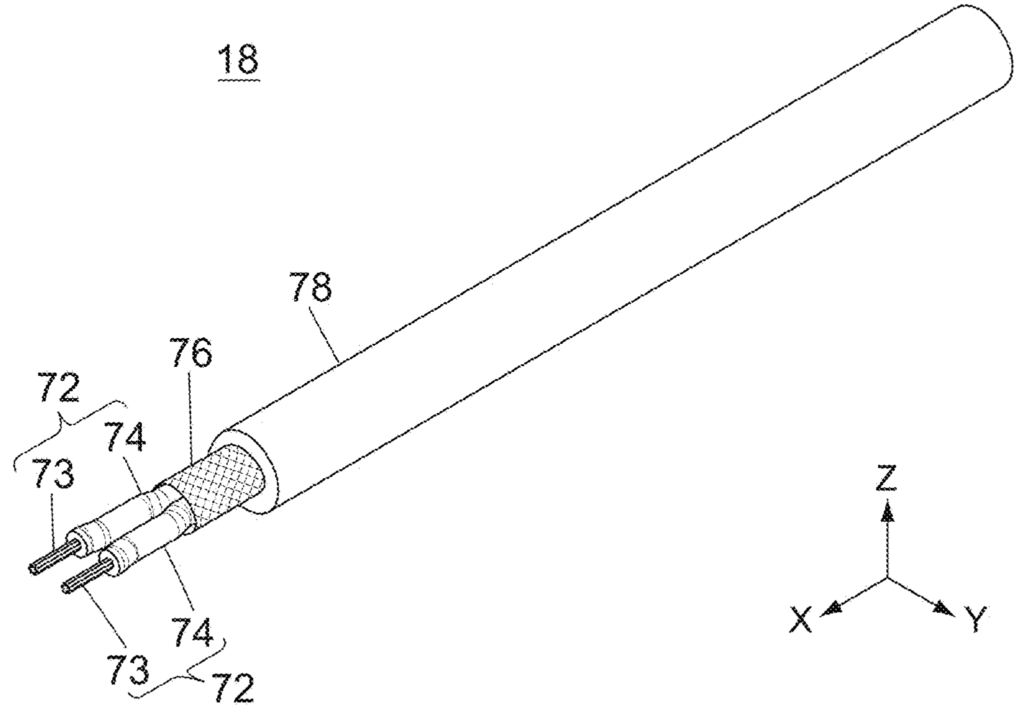
FIG. 2 is a perspective view showing a cable of the cable connector of FIG. 1.

Referring to FIG. 2, the cable 18 of the present embodiment comprises two wires 72, a braid 76 made of conductor and a sheath 78 made of insulator. The braid 76 is formed by weaving a fine wire made of metal such as copper into a mesh. Each of the wires 72 comprises a core wire 73 made of conductor and a coat 74 made of insulator. Each of the coats 74 covers the core wire 73. Each of the core wire 73 has a front end in a front-rear direction which is exposed from the coat 74. The front-rear direction of the present embodiment is the X-direction. In the present embodiment, "forward" means the positive X-direction, and "rearward" means the negative X-direction. In the present invention, the word such as the front-rear direction which indicates a positional relation does not show an absolute relation relative to the ground but merely shows a relative positional relation based on a definition that the extending direction of the illustrated cable 18 is the front-rear direction.

The two wires 72 are covered by the braid 76 in a perpendicular plane (YZ-plane) perpendicular to the front-rear direction and are thereby electro-magnetically shielded. The braid 76 is covered by the sheath 78 in the perpendicular plane. The braid 76 has a front end which is exposed from the sheath 78. Each of the wires 72 has a front end which is exposed from the braid 76. The cable 18 of the present embodiment has the aforementioned structure. However, the present invention is not limited thereto, but the structure of the cable 18 can be modified as necessary. For example, the number of the wires 72 may be one, three or more.

Referring to FIG. 1, the connector 12 is attached to the front end of the cable 18 in the front-rear direction. Thus, the connector 12 of the present embodiment is configured to be attached to the front end of the cable 18 in the front-rear direction. Hereafter, explanation will be made about the connector 12 (see FIG. 1) of the present embodiment.

The connector 12 of the present embodiment comprises a front shell 13 made of metal, a connector body 14 made of metal and a sleeve 16 made of metal. Each of the front shell 13, the connector body 14 and the sleeve 16 of the present embodiment is formed by bending a single metal plate. The connector 12 of the present embodiment comprises the three members described above. However, the present invention is not limited thereto. For example, the connector 12 may further comprise another member in addition to the three members described above. The connector 12 does not need to comprise the front shell 13. The connector body 14 may be formed of a plurality of metal pieces joined together.

Figure 3:
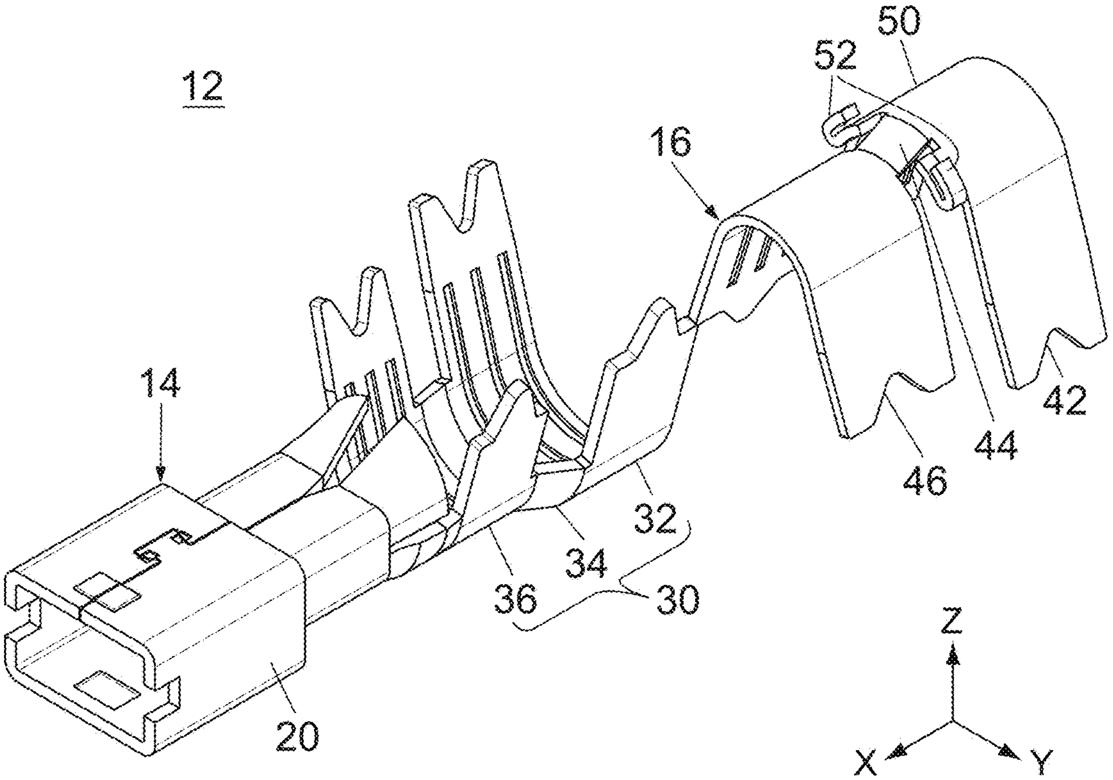
FIG. 3 is a perspective view showing a connector of the cable connector of FIG. 1, wherein the illustrated connector has a shape under a state where the connector is not attached to the cable.

Referring to FIG. 3 together with FIG. 1, the connector 12 of the present embodiment is connectable to an object 80, which is located forward thereof in the front-rear direction, along the front-rear direction. The connector body 14 has a body 20 and a barrel 30. The barrel 30 is located rearward of the body 20 in the front-rear direction. In detail, the body 20 of the present embodiment is located at a front end of the connector body 14. The body 20 receives the exposed core wires 73 (see FIG. 2) of the wires 72 (see FIG. 2) when the connector 12 is under an attached state where the connector 12 is attached to the cable 18. The barrel 30 of the present embodiment is located at a rear end of the connector body 14. The body 20 and the barrel 30 are integrally formed with each other.

The connector body 14 of the present embodiment is a back shell of the connector 12. Each of the body 20 and the barrel 30 is a part of the back shell. The body 20 of the connector body 14 is covered by the front shell 13. The front shell 13 is connectable to the object 80 together with the body 20 of the connector body 14. However, the present invention is not limited thereto. For example, in an instance in which the front shell 13 is not provided, only the body 20 may be connectable to the object 80.

Referring to FIG. 1, the object 80 of the present embodiment is an outer housing which is configured to receive and hold the front shell 13 and the connector body 14. The object 80 of the present embodiment is mateable with a mating connector (not shown) under a state where the object 80 holds the front shell 13 and the connector body 14. Thus, the connector 12 of the present embodiment is mateable with the mating connector, which is located forward thereof in the front-rear direction, along the front-rear direction. When the mating connector is mated with the object 80 which holds the front shell 13 and the connector body 14, an electronic device (not shown) connected to the cable 18 is electrically connected with a mating electronic device (not shown) connected to the mating connector. However, the present invention is not limited thereto. For example, the object 80 may be the mating connector which is connected to the mating electronic device.

Referring to FIG. 3, the sleeve 16 of the present embodiment includes a first sleeve 42 and a second sleeve 46. Each of the first sleeve 42 and the second sleeve 46 has a shape which opens downward in an up-down direction perpendicular to the front-rear direction when the connector 12 is under an unattached state where the connector 12 is not attached to the cable 18 (see FIG. 5). The up-down direction of the present embodiment is the Z-direction. In the present embodiment, "upward" means the positive Z-direction, and "downward" means the negative Z-direction.

In detail, each of the first sleeve 42 and the second sleeve 46 has two side plates. The two side plates of each of the first sleeve 42 and the second sleeve 46 are located at opposite sides of the sleeve 16 in a lateral direction perpendicular to both the front-rear direction and the up-down direction, respectively. The upper ends of the two side plates are connected to each other. The lower ends of the two side plates are apart from each other in the lateral direction. The lateral direction of the present embodiment is the Y-direction.

Figure 4:
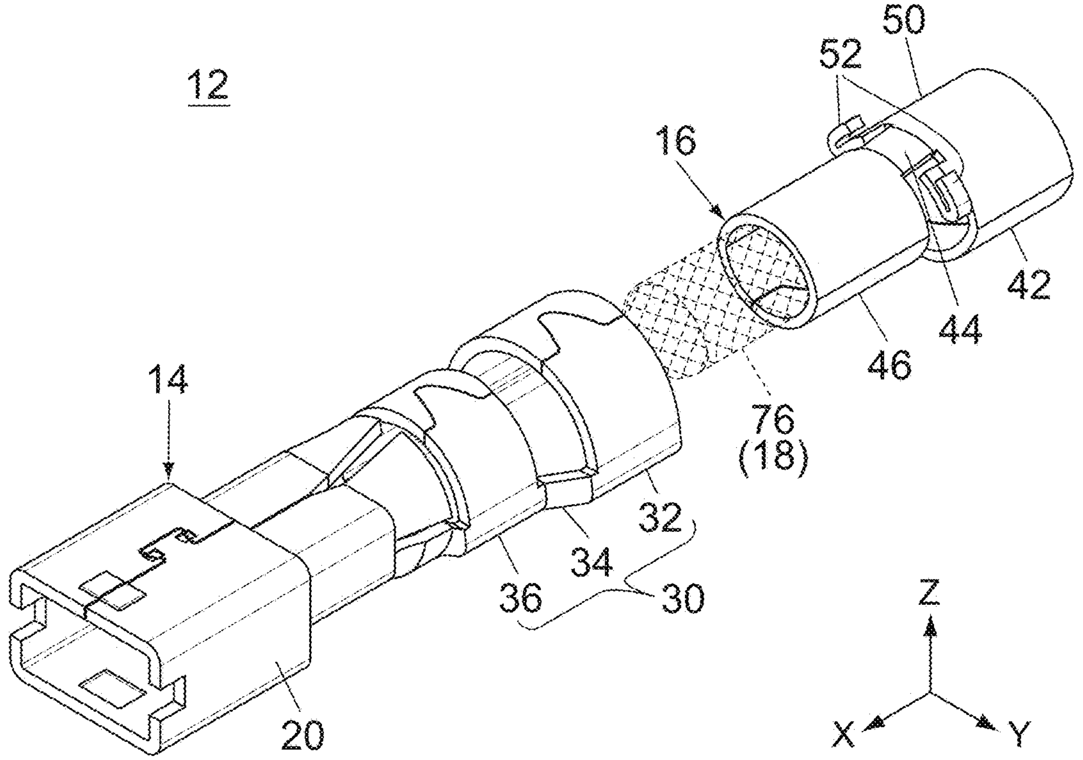
FIG. 4 is a perspective view showing the connector of FIG. 3, wherein the illustrated connector has a shape under a state where the connector is attached to the cable, and an outline of a braid onto which a second sleeve of the connector is configured to be crimped is illustrated with dashed line.
Figure 5:
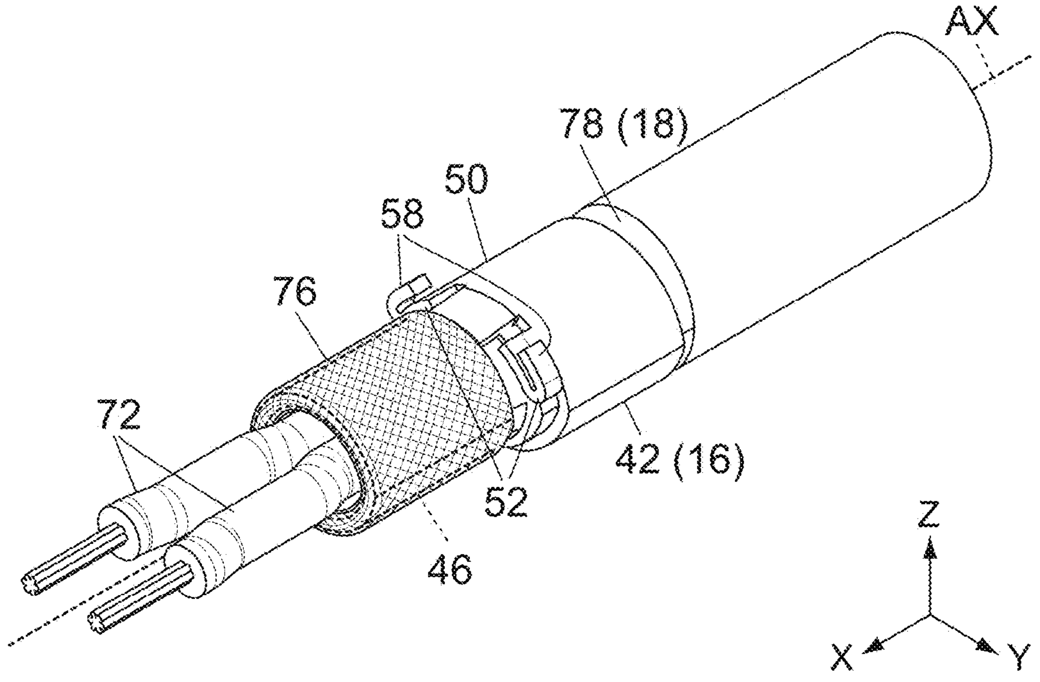
FIG. 5 is a perspective view showing a sleeve of the connector of FIG. 4, the sleeve is crimped onto the cable of FIG. 2, and an outline of a hidden second sleeve and an imaginary center axis of the connector are illustrated with dashed line.

Referring to FIGS. 4 and 5, when the connector 12 is attached to the cable 18, the first sleeve 42 is crimped onto and fixed around the sheath 78 of the cable 18, and the second sleeve 46 is crimped onto and fixed around the braid 76 of the cable 18. Thus, when the connector 12 is under the attached state, the first sleeve 42 encloses the sheath 78 in the perpendicular plane (YZ-plane) and is fixed to the sheath 78, and the second sleeve 46 encloses the braid 76 in the perpendicular plane and is fixed to the braid 76.

According to the present embodiment, the braid 76 is folded back after the second sleeve 46 is crimped onto the braid 76, and thereby the second sleeve 46 is covered by the braid 76 in the perpendicular plane (YZ-plane). According to the present embodiment, when the connector 12 is under the attached state, the second sleeve 46 covers the braid 76 in the perpendicular plane and is completely covered by the folded braid 76. According to this structure, the second sleeve 46 can be reliably in contact with the braid 76. However, the present invention is not limited thereto. For example, the folded braid 76 may partially cover the second sleeve 46 in the perpendicular plane. The braid 76 does not need to be folded back. In other words, the outer surface of the second sleeve 46 does not need to be covered by the braid 76.

According to the present embodiment, when the connector 12 is under the attached state, each of the first sleeve 42 and the second sleeve 46 has a seamless cylindrical shape enclosing a center axis AX in parallel to the front-rear direction and extends along the front-rear direction. However, the present invention is not limited thereto. For example, each of the first sleeve 42 and the second sleeve 46 may have a polygonal shape such as a hexagonal shape in the perpendicular plane (YZ-plane). Moreover, when the connector 12 is under the attached state, the joint of each of the first sleeve 42 and the second sleeve 46 may slightly open.

Referring to FIG. 3 together with FIG. 5, the sleeve 16 of the present embodiment has a coupling portion 44 in addition to the first sleeve 42 and the second sleeve 46. The coupling portion 44 extends along the front-rear direction and couples the first sleeve 42 and the second sleeve 46 together. The second sleeve 46 is located forward of the first sleeve 42. Because the coupling portion 44 is provided, the first sleeve 42 and the second sleeve 46 can be integrally formed, and the first sleeve 42 and the second sleeve 46 can be easily crimped onto the sheath 78 and the braid 76, respectively.

The sleeve 16 of the present embodiment has the aforementioned structure. However, the present invention is not limited thereto, but the structure of the sleeve 16 can be variously modified. For example, the sleeve 16 may have only the second sleeve 46. Moreover, the first sleeve 42 and the second sleeve 46 may be members separated from each other. In this instance, the coupling portion 44 does not need to be provided.

The first sleeve 42 and the second sleeve 46 may be cylinders separated from each other when the connector 12 is under the unattached state. In this instance, the cable 18 may be inserted into the first sleeve 42 and the second sleeve 46, and the first sleeve 42 and the second sleeve 46 may be arranged so that they enclose the sheath 78 and the braid 76, respectively. Then, the first sleeve 42 and the second sleeve 46 may be crimped on the sheath 78 and the braid 76, respectively.

Referring to FIG. 3, the barrel 30 of the present embodiment includes a first barrel (barrel) 32 which corresponds to the first sleeve 42 and a second barrel (barrel) 36 which corresponds to the second sleeve 46. Thus, the connector body 14 of the present embodiment has the two barrels 32 and 36. Each of the two barrels 32 and 36 is located rearward of the body 20 in the front-rear direction and has a shape which opens upward when the connector 12 is under the unattached state.

Figure 6:
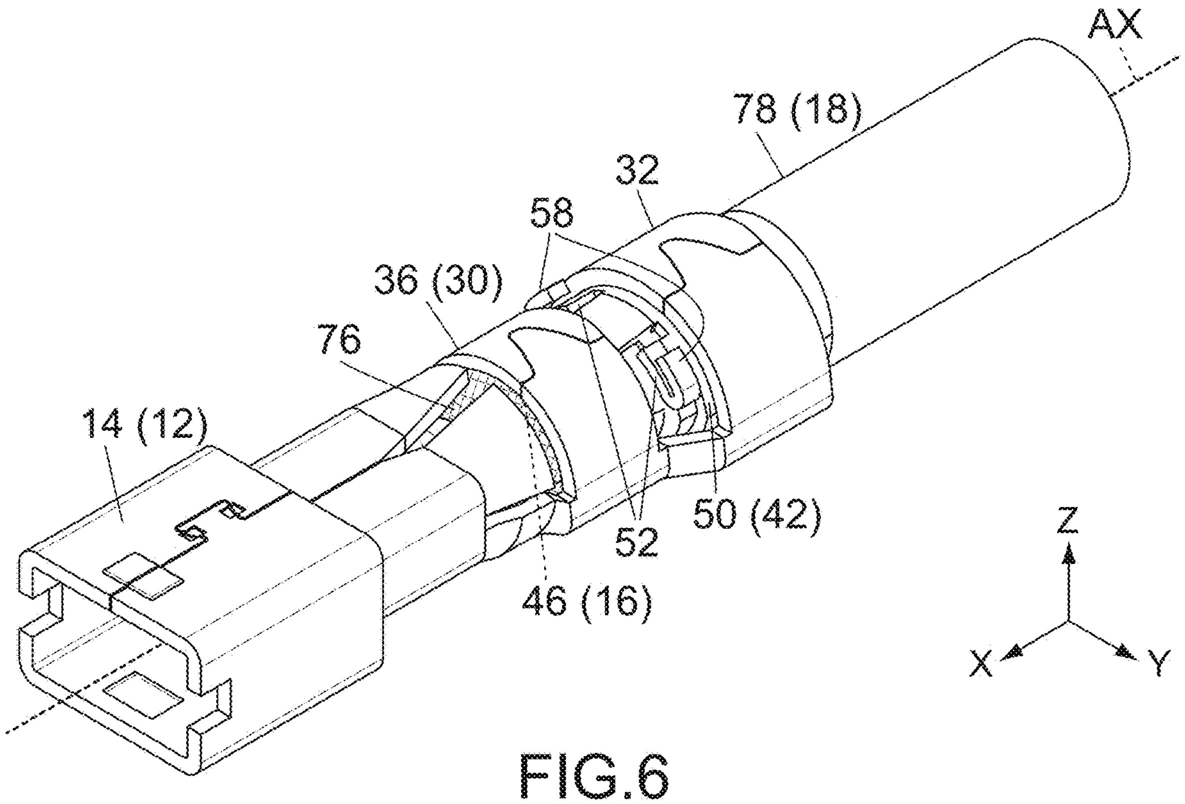
FIG. 6 is a perspective view showing a connector body and the sleeve of the connector of FIG. 4, wherein a barrel of the connector is crimped onto the sleeve of FIG. 5, and the imaginary center axis of the connector is illustrated with dashed line.

Referring to FIGS. 4 and 6, when the connector 12 is attached to the cable 18, the first barrel 32 is crimped onto and fixed around the first sleeve 42, and the second barrel 36 is crimped onto and fixed around the second sleeve 46 via the braid 76. Thus, when the connector 12 is under the attached state, the first barrel 32 encloses the first sleeve 42 in the perpendicular plane (YZ-plane) and is fixed to the first sleeve 42, and the second barrel 36 encloses the second sleeve 46 in the perpendicular plane and is fixed to the second sleeve 46.

When the connector 12 is under the attached state, the second barrel 36 and the second sleeve 46 covered by the braid 76 sandwich the braid 76 therebetween and are in contact with the braid 76, and thereby the connector body 14 is electrically connected with the braid 76 of the cable 18. Thus, when the connector 12 is under the attached state, the connector body 14 has a ground potential same as that of the braid 76 and electro-magnetically shields the exposed core wires 73 (see FIG. 2) of the cable 18.

In the present embodiment, the second barrel 36 is crimped onto the second sleeve 46 via the braid 76. However, the present invention is not limited thereto. For example, in an instance in which the second sleeve 46 is not covered by the braid 76, the second barrel 36 may be directly crimped onto the second sleeve 46. In another instance in which the second sleeve 46 is a member separated from the first sleeve 42 and has a cylindrical shape, the second sleeve 46 may be inserted inside the braid 76 in the perpendicular plane (YZ-plane), and the second barrel 36 may be crimped onto the second sleeve 46 together with the braid 76.

Each of the first barrel 32 and the second barrel 36 of the present embodiment has a seamless cylindrical shape which encloses the center axis AX and extends along the front-rear direction when the connector 12 is under the attached state. However, the present invention is not limited thereto. For example, each of the first barrel 32 and the second barrel 36 may have a polygonal shape such as a hexagonal shape in the perpendicular plane (YZ-plane). Moreover, when the connector 12 is under the attached state, the joint of each of the first barrel 32 and the second barrel 36 may slightly open.

Referring to FIG. 3, the barrel 30 of the present embodiment has a middle portion 34 in addition to the first barrel 32 and the second barrel 36. The middle portion 34 extends along the front-rear direction and couples the first barrel 32 and the second barrel 36 together. The second barrel 36 is located forward of the first barrel 32. Because the middle portion 34 is provided, the first barrel 32 and the second barrel 36 can be integrally formed, and the first barrel 32 and the second barrel 36 can be easily crimped onto the first sleeve 42 and the second sleeve 46, respectively.

The barrel 30 of the present embodiment has the aforementioned structure. However, the present invention is not limited thereto, but the structure of the barrel 30 can be variously modified. For example, in an instance in which the sleeve 16 has only the second sleeve 46, the barrel 30 may have only the second barrel 36. Thus, the connector body 14 may have only one barrel. Instead, the connector body 14 may have three or more barrels.

Hereafter, more specific explanation will be made about the sleeve 16 of the present embodiment.

Referring to FIGS. 4 and 5, the sleeve 16 of the present embodiment has a main portion 50 and two projecting portions 52. As described later, each of the projecting portions 52 is a part for reducing displacement of the sleeve 16 relative to the barrel 30. In the present embodiment, the main portion 50 and the projecting portions 52 are provided on the first sleeve 42. According to this structure, the second sleeve 46 is easily covered by the braid 76. However, the present invention is not limited thereto. For example, in an instance in which the second sleeve 46 is not covered by the braid 76 or in another instance in which the sleeve 16 has only the second sleeve 46, the main portion 50 and the projecting portions 52 may be provided on the second sleeve 46.

Referring to FIG. 5, regardless of whether the main portion 50 is provided on the first sleeve 42 or the second sleeve 46, the main portion 50 encloses the cable 18 in the perpendicular plane (YZ-plane) and is fixed to the cable 18 when the connector 12 is under the attached state. Each of the projecting portions 52 extends forward from the main portion 50 and has a stopper 58. Each of the stoppers 58 is located forward of the main portion 50. Each of the stoppers 58 is located outward of the main portion 50 in the perpendicular plane when the connector 12 is under the attached state. Referring to FIG. 6, when the connector 12 is under the attached state, the barrel 32 encloses the main portion 50 in the perpendicular plane and is fixed to the main portion 50, and the stoppers 58 of the projecting portions 52 are located forward of the barrel 32.

Referring to FIG. 1, the cable connector 10 of the present embodiment has the structure described above. In detail, the main portion 50 encloses the cable 18 in the perpendicular plane (YZ-plane) and is fixed to the cable 18. Each of the projecting portions 52 extends forward from the main portion 50 and has the stopper 58. The stoppers 58 are located forward of the main portion 50 and are located outward of the main portion 50 in the perpendicular plane. The barrel 32 encloses the main portion 50 in the perpendicular plane and is fixed to the main portion 50. The stoppers 58 of the projecting portions 52 are located forward of the barrel 32.

In general, the sleeve 16 is crimped onto the cable 18 with a large force to be securely fixed to the cable 18. In contrast, if the barrel 30 is crimped onto the sleeve 16 with a large force, electrical connection problems might sometimes occur. For example, transmission characteristics of the connector 12 might be degraded. Accordingly, the barrel 30 is crimped with a relatively small force. According to this crimping manner, the sleeve 16 might be moved together with the cable 18 and might be displaced relative to the barrel 30. In particular, when the cable 18 is pulled rearward hard, the sleeve 16 might be displaced.

However, the sleeve 16 of the present embodiment has the projecting portion 52. The projecting portion 52 extends forward from the main portion 50. The stopper 58 of the projecting portion 52 is located forward of the main portion 50 and the barrel 32 and projects outward beyond an outer surface of the main portion 50 in the perpendicular plane (YZ-plane). The thus-formed stopper 58 is brought into abutment with a front end of the barrel 32 when the sleeve 16 is moved rearward together with the cable 18. As a result, the displacement of the sleeve 16 can be reduced.

If the projecting portion 52 for reducing displacement were to project outward from the outer surface of the main portion 50, the barrel 32 might be unintentionally crimped on the projecting portion 52. In this case, the barrel 32 might be insufficiently fixed to the sleeve 16. In addition, when a force were to be applied to the projecting portion 52 upon crimping the barrel 32, the projecting portion 52 might be damaged.

In contrast, according to the present embodiment, even when the barrel 32 is crimped on the stopper 58, the stopper 58 is moved toward the cable 18. Even when the stopper 58 is largely moved, the projecting portion 52 is caught by the soft sheath 78. As a result, the projecting portion 52 can be prevented from being damaged. Thus, the present embodiment provides the connector 12 with a structure which can reduce displacement of the sleeve 16 relative to the barrel 30 and which can prevent the sleeve 16 from being damaged when the barrel 30 is crimped.

Referring to FIG. 6, each of the projecting portions 52 of the present embodiment is resiliently deformable in the perpendicular plane (YZ-plane). According to this structure, each of the projecting portions 52 can be reliably prevented from being damaged. For example, even when a force is applied to a rear end of the stopper 58 upon crimping the barrel 32, the projecting portion 52 returns to its initial shape after the crimping of the barrel 32, and thereby the displacement of the sleeve 16 is reduced.

Figure 7:
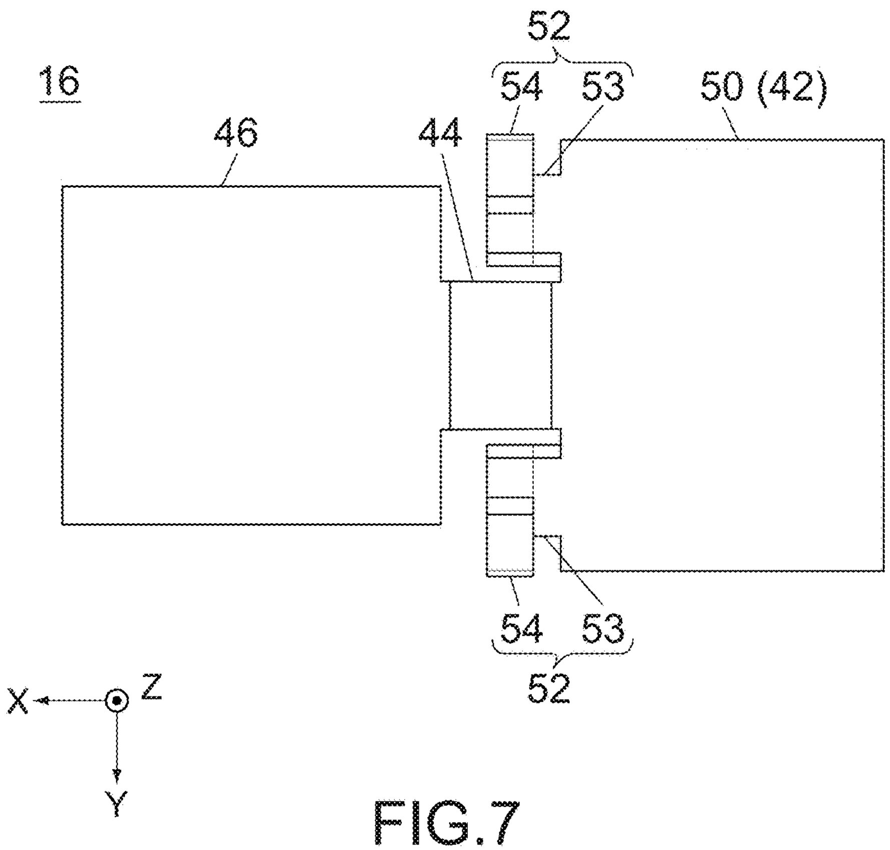
FIG. 7 is a top view showing the sleeve of the connector of FIG. 4.
Figure 8:
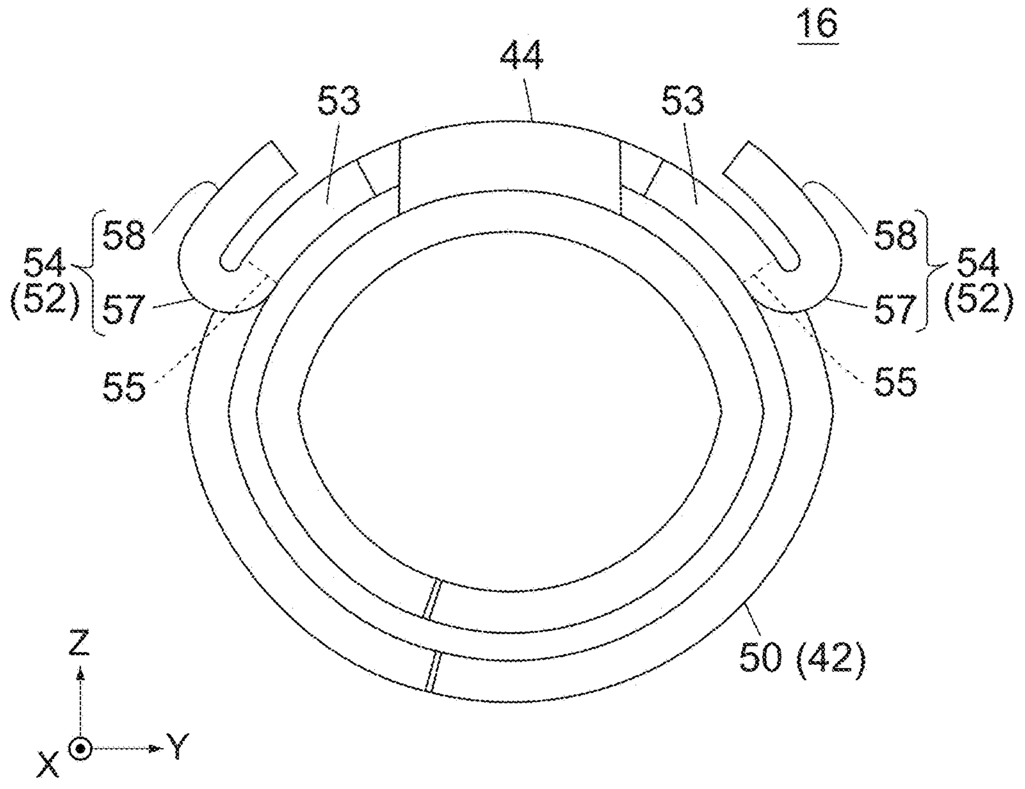
FIG. 8 is a front view showing the sleeve of the connector of FIG. 4, wherein a boundary between a first portion and a second portion of each of projecting portions is illustrated with dashed line.

Referring to FIGS. 4, 7 and 8, according to the present embodiment, the main portion 50 is provided with the two projecting portions 52. In other words, the number of the projecting portions 52 of the present embodiment is two. The two projecting portions 52 are located at opposite sides of the coupling portion 44 in the lateral direction, respectively, and have a symmetric shape with respect to a predetermined plane (XZ-plane). According to this structure, the displacement of the sleeve 16 can be more reliably reduced in well balance. However, the present invention is not limited thereto. For example, the two projecting portions 52 may have an unsymmetric shape with respect to the predetermined plane. The number of the projecting portions 52 may be one, three or more.

Hereafter, explanation will be made about one of the projecting portions 52. The explanation described below is applicable to a remaining one of the projecting portions 52.

As shown in FIG. 7, according to the present embodiment, the projecting portion 52 is located only forward of a front end of the main portion 50. According to this arrangement, the projecting portion 52 can be more reliably prevented from being damaged. However, the present invention is not limited thereto. For example, the projecting portion 52 may be partially located rearward of the front end of the main portion 50.

Referring to FIG. 8 together with FIG. 7, the projecting portion 52 of the present embodiment has a first portion 53 and a second portion 54. The first portion 53 extends forward from the main portion 50. The second portion 54 is connected to the first portion 53 and extends outward away from the main portion 50 in the perpendicular plane (YZ-plane). The second portion 54 has a folded portion 57 and the aforementioned stopper 58. Thus, the projecting portion 52 of the present embodiment has the folded portion 57 in addition to the stopper 58.

The second portion 54 is connected to the first portion 53 at a boundary 55. The boundary 55 is located at one of opposite edges of a front end portion of the first portion 53 in the lateral direction, wherein the one of opposite edges is farther from the coupling portion 44 than a remaining one of the opposite edges is. The folded portion 57 is connected to the boundary 55 and is folded toward the coupling portion 44. In detail, the folded portion 57 is folded into an arc so that it is away outward from the main portion 50 in the perpendicular plane (YZ-plane). The stopper 58 is located outward of the main portion 50 in the perpendicular plane and extends from the folded portion 57 toward the coupling portion 44.

The projecting portion 52 of the present embodiment has the aforementioned structure. However, the present invention is not limited thereto, but the structure of the projecting portion 52 can be variously modified. Hereafter, explanation will be made about seven modifications of the projecting portion 52, in particular about differences from the present embodiment. Referring to FIG. 6, every one of the connectors of the seven modifications has the structure same as that of the connector 12 except for its sleeve. Every one of the seven modifications provides the connector with a structure which can reduce displacement of the sleeve relative to the barrel 30 and which can prevent the sleeve from being damaged when the barrel 30 is crimped.

Figure 9:
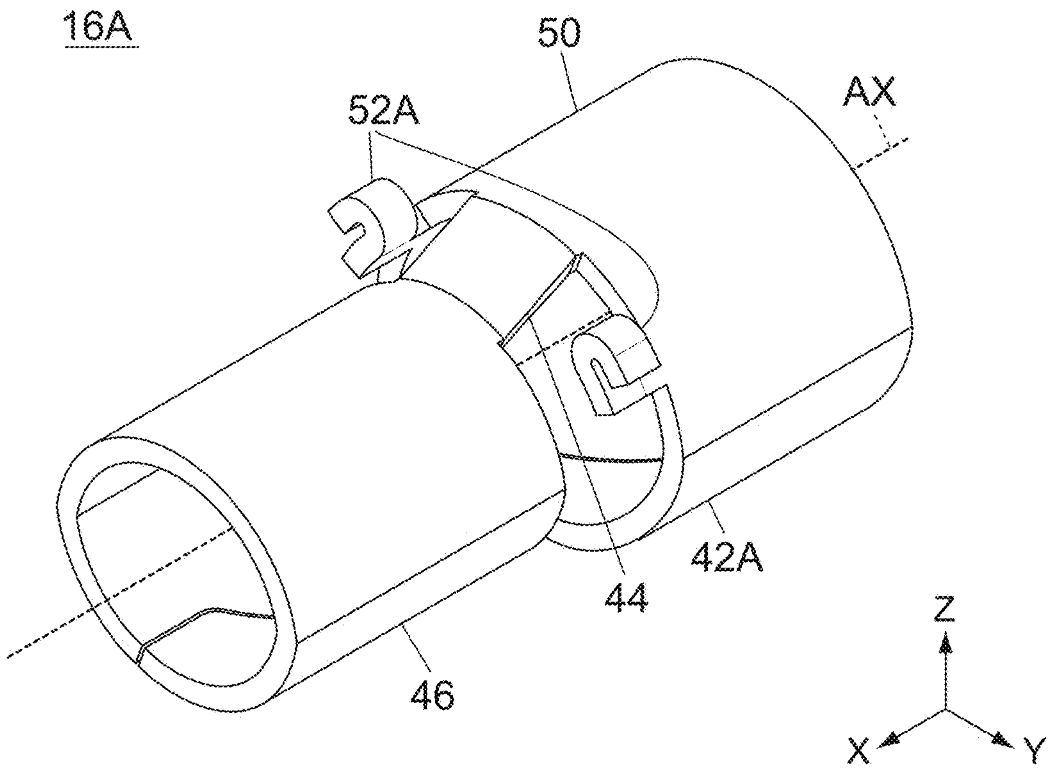
FIG. 9 is a perspective view showing a first modification of the sleeve of the connector of FIG. 4, wherein the imaginary center axis of the connector is illustrated with dashed line.

Referring to FIG. 9, a sleeve 16A according to a first modification has the main portion 50 and two projecting portions 52A. The sleeve 16A has the structure same as that of the sleeve 16 (see FIG. 4) except for the projecting portions 52A. The main portion 50 and the projecting portions 52A are provided on a first sleeve 42A. The two projecting portions 52A are located at opposite sides of the coupling portion 44 in the lateral direction, respectively, and have a symmetric shape with respect to the predetermined plane (XZ-plane). Hereafter, explanation will be made about one of the projecting portions 52A. The explanation described below is applicable to a remaining one of the projecting portions 52A.

Figure 10:
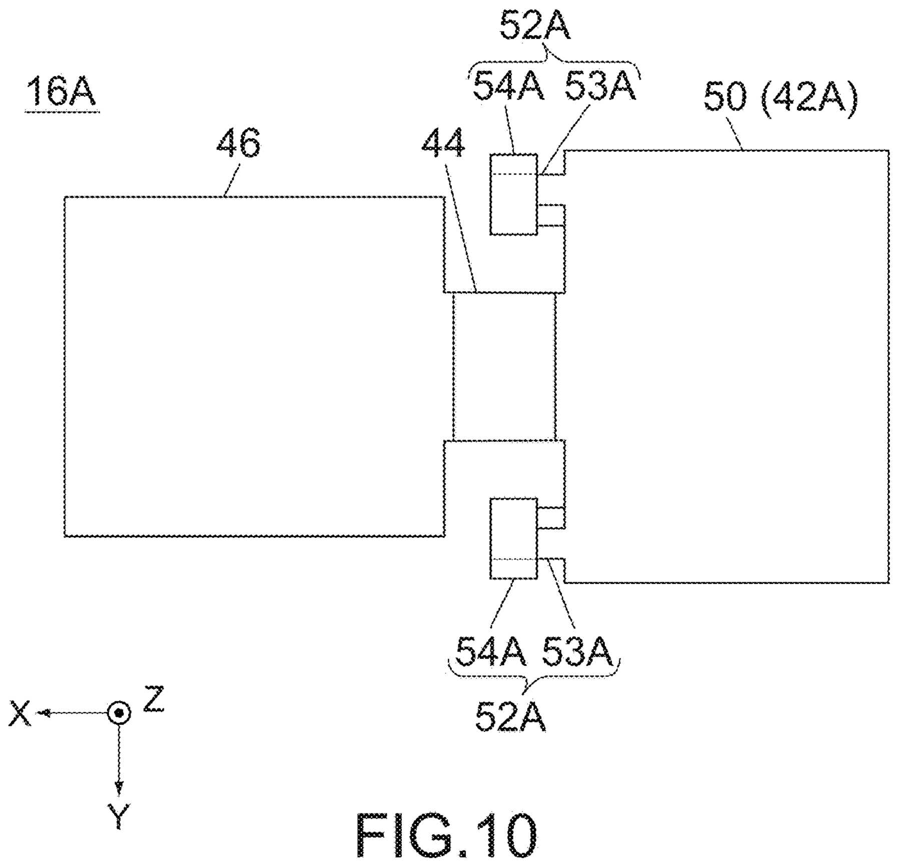
FIG. 10 is a top view showing the sleeve of FIG. 9.
Figure 11:
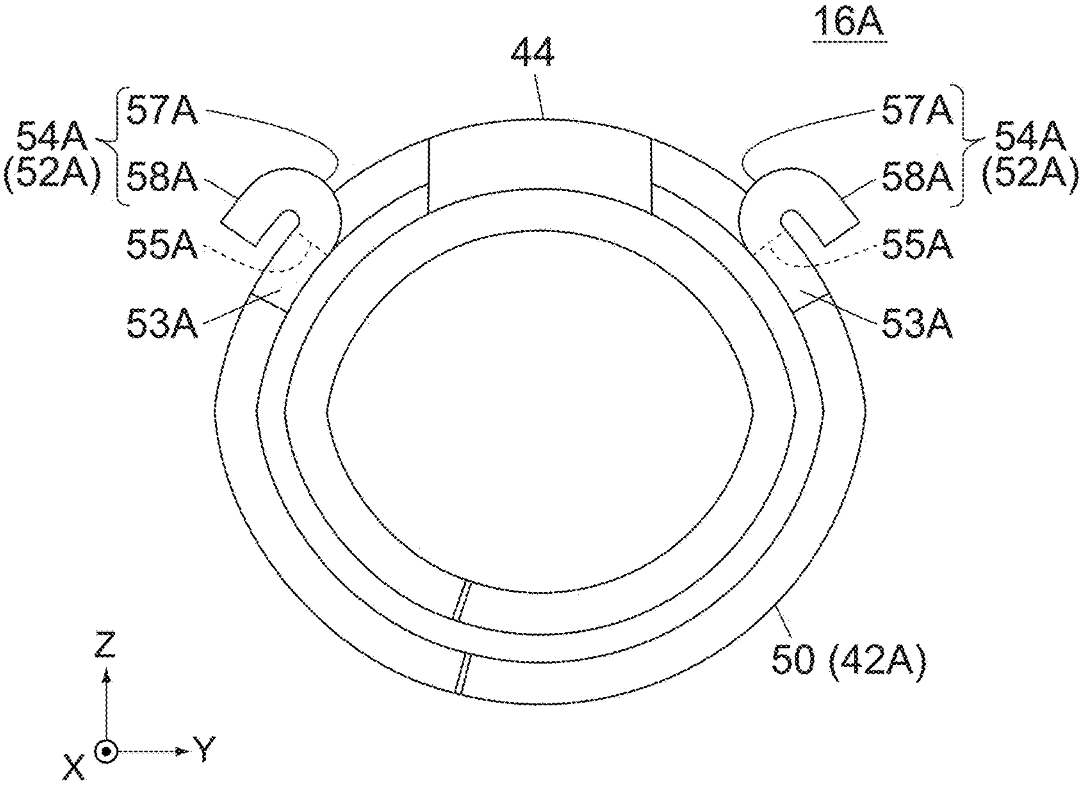
FIG. 11 is a front view showing the sleeve of FIG. 9, wherein a boundary between a first portion and a second portion of each of projecting portions is illustrated with dashed line.

Referring to FIG. 11 together with FIG. 10, the projecting portion 52A of the present modification has a first portion 53A and a second portion 54A. The first portion 53A extends forward from the main portion 50. The second portion 54A is connected to the first portion 53A and extends outward away from the main portion 50 in the perpendicular plane (YZ-plane). The second portion 54A has a folded portion 57A and a stopper 58A. Thus, the projecting portion 52A of the present modification has the folded portion 57A and the stopper 58A.

The second portion 54A is connected to the first portion 53A at a boundary 55A. The boundary 55A is located at one of opposite edges of a front end portion of the first portion 53A in the lateral direction, wherein the one of opposite edges is nearer to the coupling portion 44 than a remaining one of the opposite edges is. The folded portion 57A is connected to the boundary 55A and is folded away from the coupling portion 44. In detail, the folded portion 57A is folded into an arc so that it is away outward from the main portion 50 in the perpendicular plane (YZ-plane). The stopper 58A is located outward of the main portion 50 in the perpendicular plane and extends from the folded portion 57A while being away from the coupling portion 44.

Figure 12:
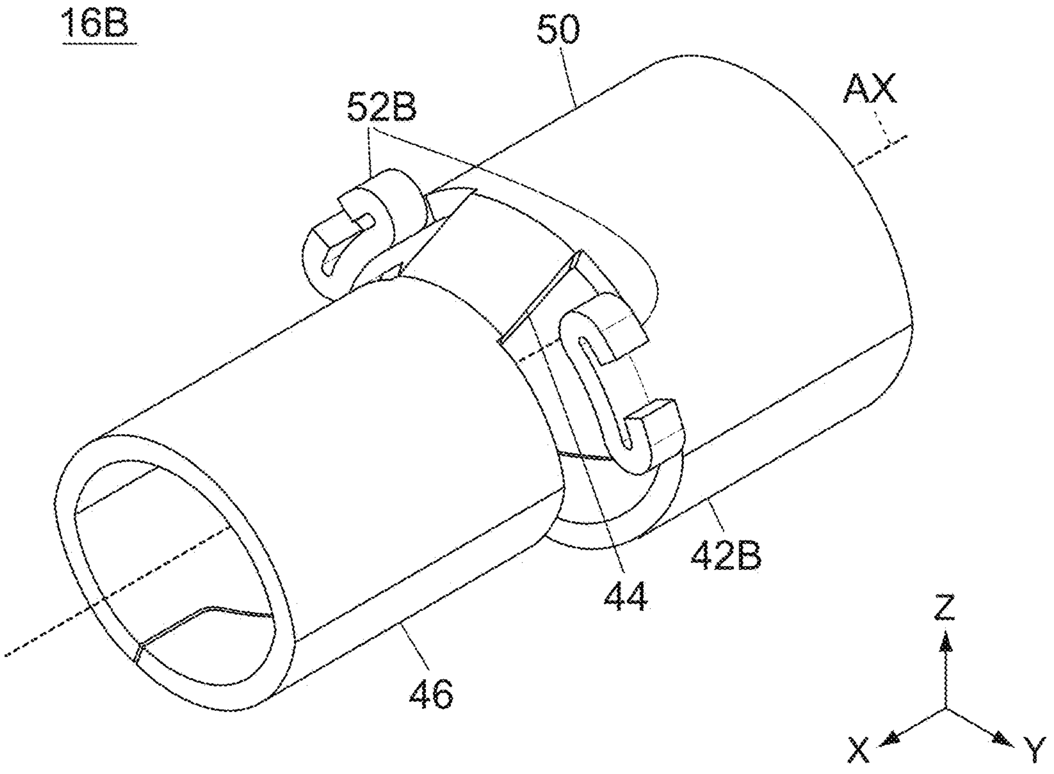
FIG. 12 is a perspective view showing a second modification of the sleeve of the connector of FIG. 4, wherein the imaginary center axis of the connector is illustrated with dashed line.

Referring to FIG. 12, a sleeve 16B according to a second modification has the main portion 50 and two projecting portions 52B. The sleeve 16B has the structure same as that of the sleeve 16 (see FIG. 4) except for the projecting portions 52B. The main portion 50 and the projecting portions 52B are provided on a first sleeve 42B. The two projecting portions 52B are located at opposite sides of the coupling portion 44 in the lateral direction, respectively, and have a symmetric shape with respect to the predetermined plane (XZ-plane). Hereafter, explanation will be made about one of the projecting portions 52B. The explanation described below is applicable to a remaining one of the projecting portions 52B.

Figure 13:
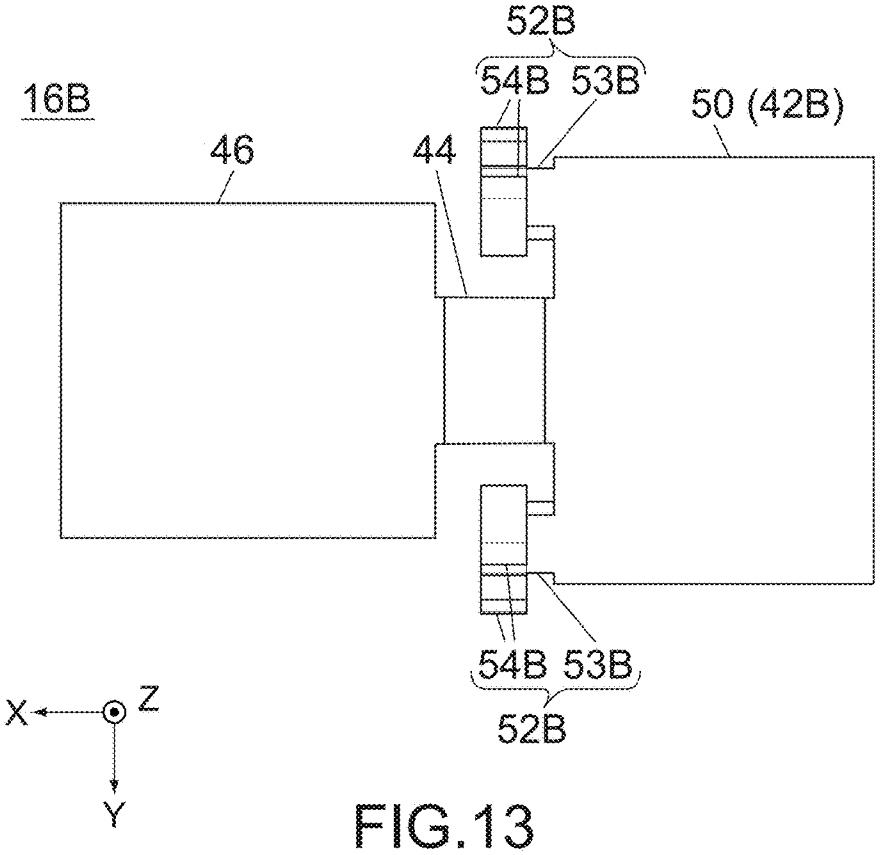
FIG. 13 is a top view showing the sleeve of FIG. 12.
Figure 14:
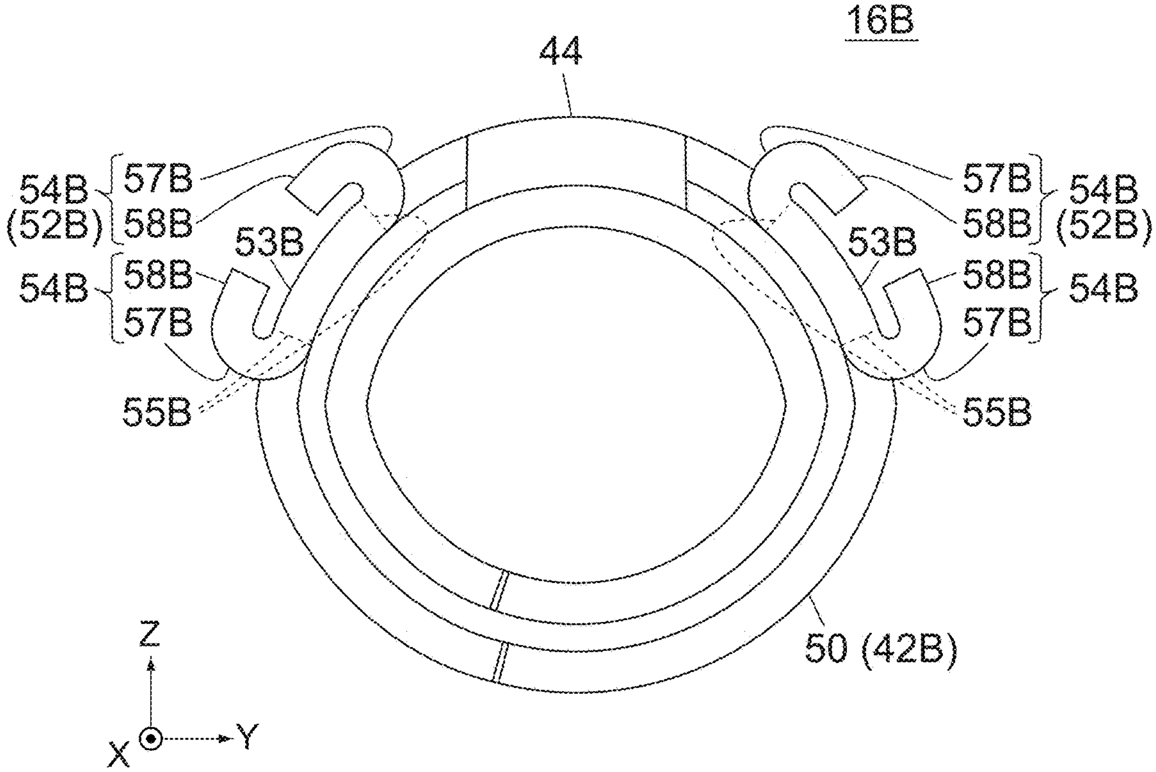
FIG. 14 is a front view showing the sleeve of FIG. 12, wherein boundaries between a first portion and second portions of each of projecting portions are illustrated with dashed line.

Referring to FIG. 14 together with FIG. 13, the projecting portion 52B of the present modification has a first portion 53B and two second portions 54B. The first portion 53B extends forward from the main portion 50. Each of the second portions 54B is connected to the first portion 53B and extends outward away from the main portion 50 in the perpendicular plane (YZ-plane). The two second portions 54B extend away from each other in the perpendicular plane. Each of the second portions 54B has a folded portion 57B and a stopper 58B. Thus, the projecting portion 52B of the present modification has the two folded portions 57B and the two stoppers 58B.

Each of the second portions 54B is connected to the first portion 53B at a boundary 55B. The two boundaries 55B are located at opposite edges of a front end portion of the first portion 53B in the lateral direction, respectively. Each of the folded portions 57B is connected to the boundary 55B. One of the folded portions 57B is folded toward the coupling portion 44 similarly to the folded portion 57 (see FIG. 8). A remaining one of the folded portions 57B is folded away from the coupling portion 44 similarly to the folded portion 57A (see FIG. 11). Each of the stoppers 58B extends from the folded portion 57B similarly to the stopper 58 (see FIG. 8) or the stopper 58A (see FIG. 11) and is located outward of the main portion 50 in the perpendicular plane.

Figure 15:
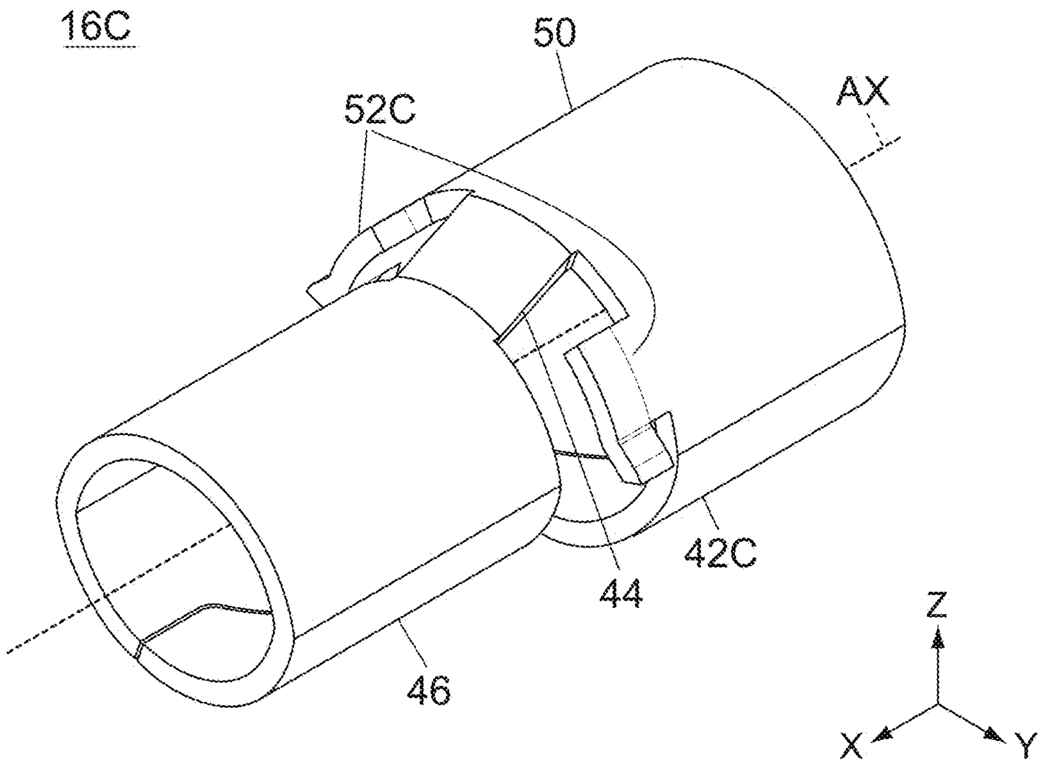
FIG. 15 is a perspective view showing a third modification of the sleeve of the connector of FIG. 4, wherein the imaginary center axis of the connector is illustrated with dashed line.

Referring to FIG. 15, a sleeve 16C according to a third modification has the main portion 50 and two projecting portions 52C. The sleeve 16C has the structure same as that of the sleeve 16 (see FIG. 4) except for the projecting portions 52C. The main portion 50 and the projecting portions 52C are provided on a first sleeve 42C. The two projecting portions 52C are located at opposite sides of the coupling portion 44 in the lateral direction, respectively, and have a symmetric shape with respect to the predetermined plane (XZ-plane). More specifically, each of the projecting portions 52C has an L-like shape when seen along a perpendicular direction perpendicular to the center axis AX of the sleeve 16C. Hereafter, explanation will be made about one of the projecting portions 52C. The explanation described below is applicable to a remaining one of the projecting portions 52C.

Figure 16:
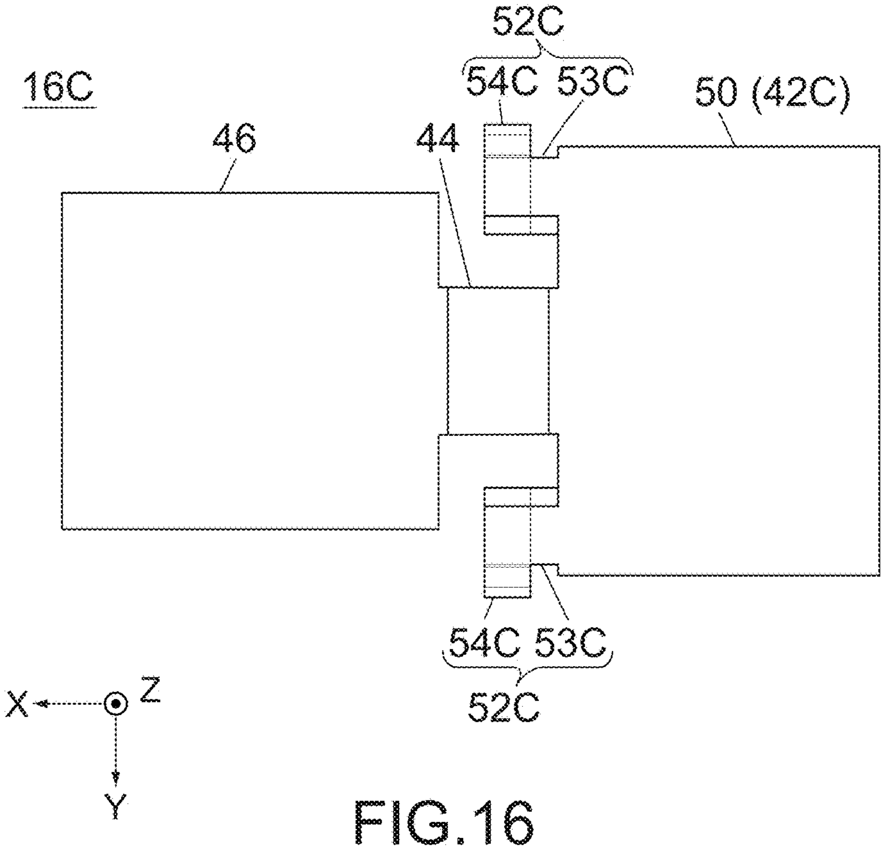
FIG. 16 is a top view showing the sleeve of FIG. 15.
Figure 17:
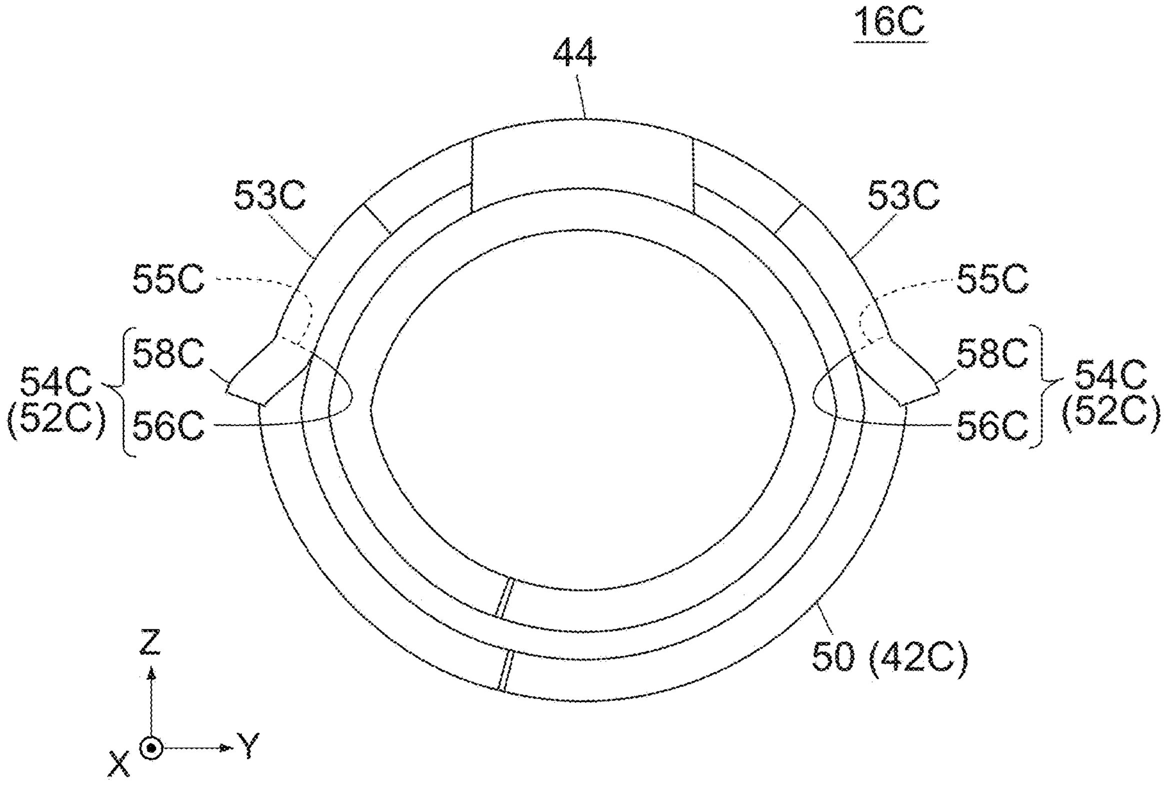
FIG. 17 is a front view showing the sleeve of FIG. 15, wherein a boundary between a first portion and a second portion of each of projecting portions is illustrated with dashed line.

Referring to FIG. 17 together with FIG. 16, the projecting portion 52C of the present modification has a first portion 53C and a second portion 54C. The first portion 53C extends forward from the main portion 50. The second portion 54C is connected to the first portion 53C and extends outward away from the main portion 50 in the perpendicular plane (YZ-plane). The second portion 54C has a bent portion 56C and a stopper 58C. Thus, the projecting portion 52C of the present modification has the bent portion 56C and the stopper 58C.

The second portion 54C is connected to the first portion 53C at a boundary 55C. The boundary 55C is located at one of opposite edges of a front end portion of the first portion 53C in the lateral direction, wherein the one of opposite edges is farther from the coupling portion 44 than a remaining one of the opposite edges is. The bent portion 56C is connected to the boundary 55C and is bent outward away from the main portion 50 in the perpendicular plane (YZ-plane). The stopper 58C is connected to the bent portion 56C and is located outward of the main portion 50 in the perpendicular plane.

Figure 18:
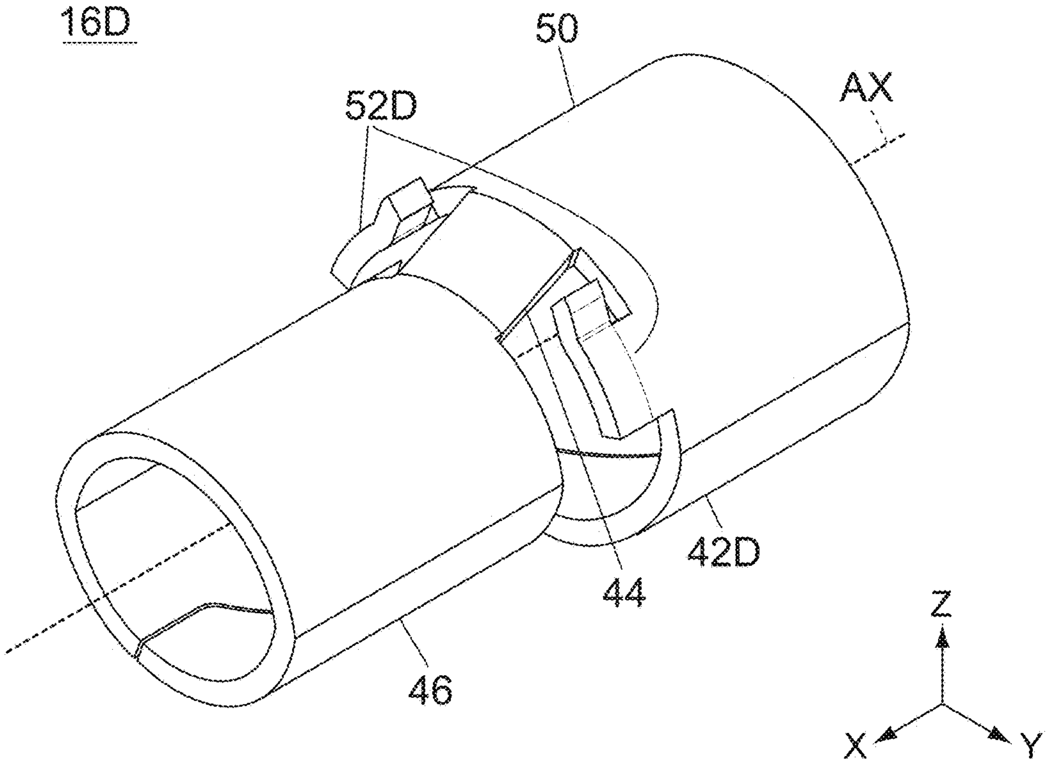
FIG. 18 is a perspective view showing a fourth modification of the sleeve of the connector of FIG. 4, wherein the imaginary center axis of the connector is illustrated with dashed line.

Referring to FIG. 18, a sleeve 16D according to a fourth modification has the main portion 50 and two projecting portions 52D. The sleeve 16D has the structure same as that of the sleeve 16 (see FIG. 4) except for the projecting portions 52D. The main portion 50 and the projecting portions 52D are provided on a first sleeve 42D. The two projecting portions 52D are located at opposite sides of the coupling portion 44 in the lateral direction, respectively, and have a symmetric shape with respect to the predetermined plane (XZ-plane). More specifically, each of the projecting portions 52D has an L-like shape when seen along a perpendicular direction perpendicular to the center axis AX of the sleeve 16D. Hereafter, explanation will be made about one of the projecting portions 52D. The explanation described below is applicable to a remaining one of the projecting portions 52D.

Figure 19:
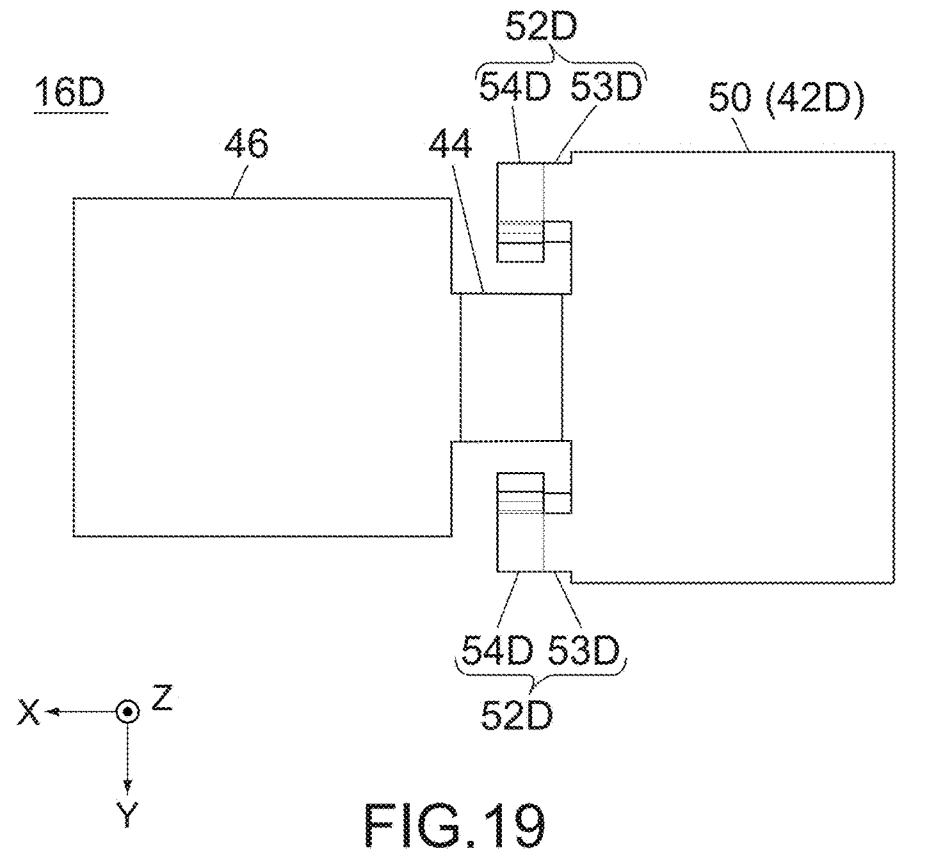
FIG. 19 is a top view showing the sleeve of FIG. 18.
Figure 20:
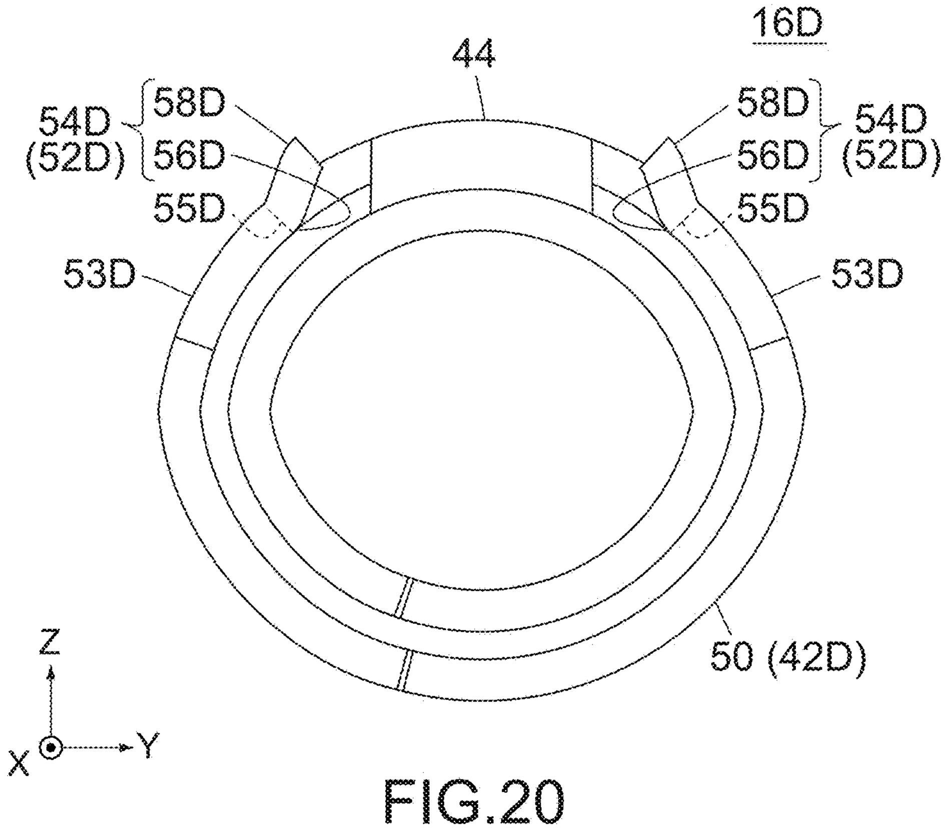
FIG. 20 is a front view showing the sleeve of FIG. 18, wherein a boundary between a first portion and a second portion of each of projecting portions is illustrated with dashed line.

Referring to FIG. 20 together with FIG. 19, the projecting portion 52D of the present modification has a first portion 53D and a second portion 54D. The first portion 53D extends forward from the main portion 50. The second portion 54D is connected to the first portion 53D and extends outward away from the main portion 50 in the perpendicular plane (YZ-plane). The second portion 54D has a bent portion 56D and a stopper 58D. Thus, the projecting portion 52D of the present modification has the bent portion 56D and the stopper 58D.

The second portion 54D is connected to the first portion 53D at a boundary 55D. The boundary 55D is located at one of opposite edges of a front end portion of the first portion 53D in the lateral direction, wherein the one of opposite edges is nearer to the coupling portion 44 than a remaining one of the opposite edges is. The bent portion 56D is connected to the boundary 55D and is bent outward away from the main portion 50 in the perpendicular plane (YZ-plane). The stopper 58D is connected to the bent portion 56D and is located outward of the main portion 50 in the perpendicular plane.

Figure 21:
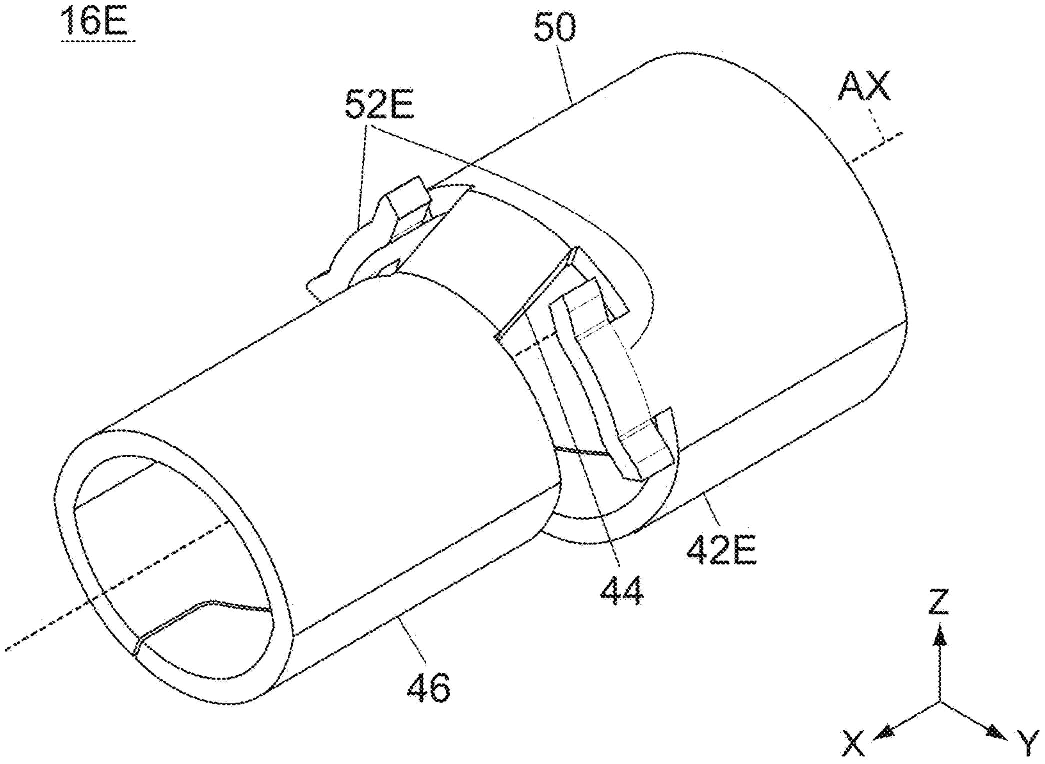
FIG. 21 is a perspective view showing a fifth modification of the sleeve of the connector of FIG. 4, wherein the imaginary center axis of the connector is illustrated with dashed line.

Referring to FIG. 21, a sleeve 16E according to a fifth modification has the main portion 50 and two projecting portions 52E. The sleeve 16E has the structure same as that of the sleeve 16 (see FIG. 4) except for the projecting portions 52E. The main portion 50 and the projecting portions 52E are provided on a first sleeve 42E. The two projecting portions 52E are located at opposite sides of the coupling portion 44 in the lateral direction, respectively, and have a symmetric shape with respect to the predetermined plane (XZ-plane). More specifically, each of the projecting portions 52E has a T-like shape when seen along a perpendicular direction perpendicular to the center axis AX of the sleeve 16E. Hereafter, explanation will be made about one of the projecting portions 52E. The explanation described below is applicable to a remaining one of the projecting portions 52E.

Figure 22:
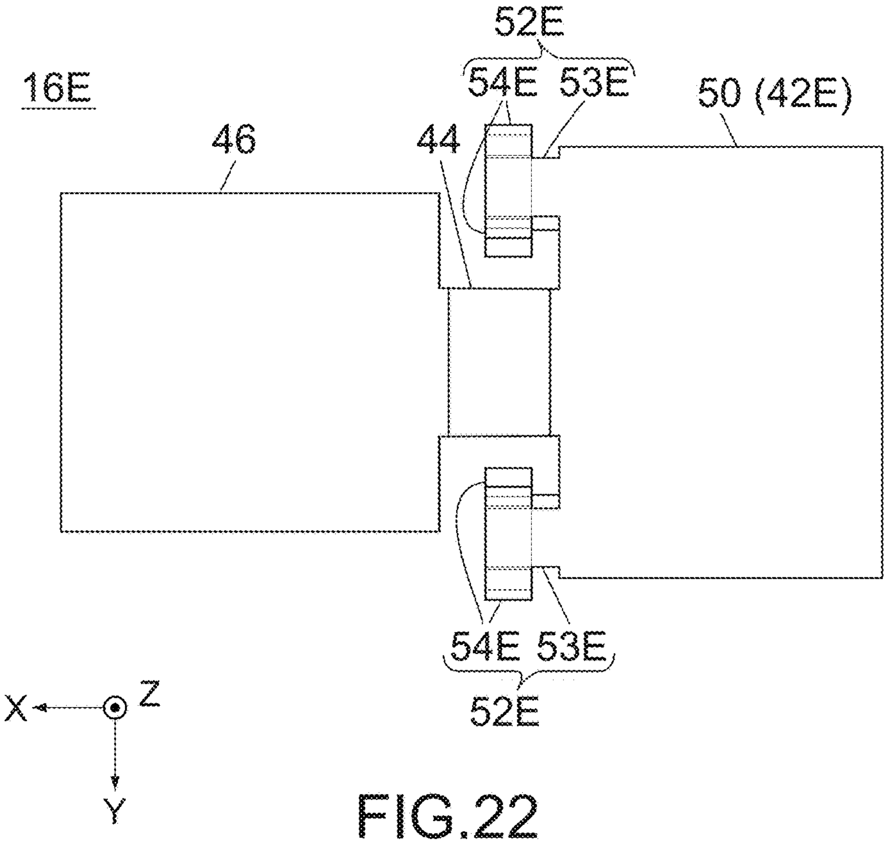
FIG. 22 is a top view showing the sleeve of FIG. 21.
Figure 23:
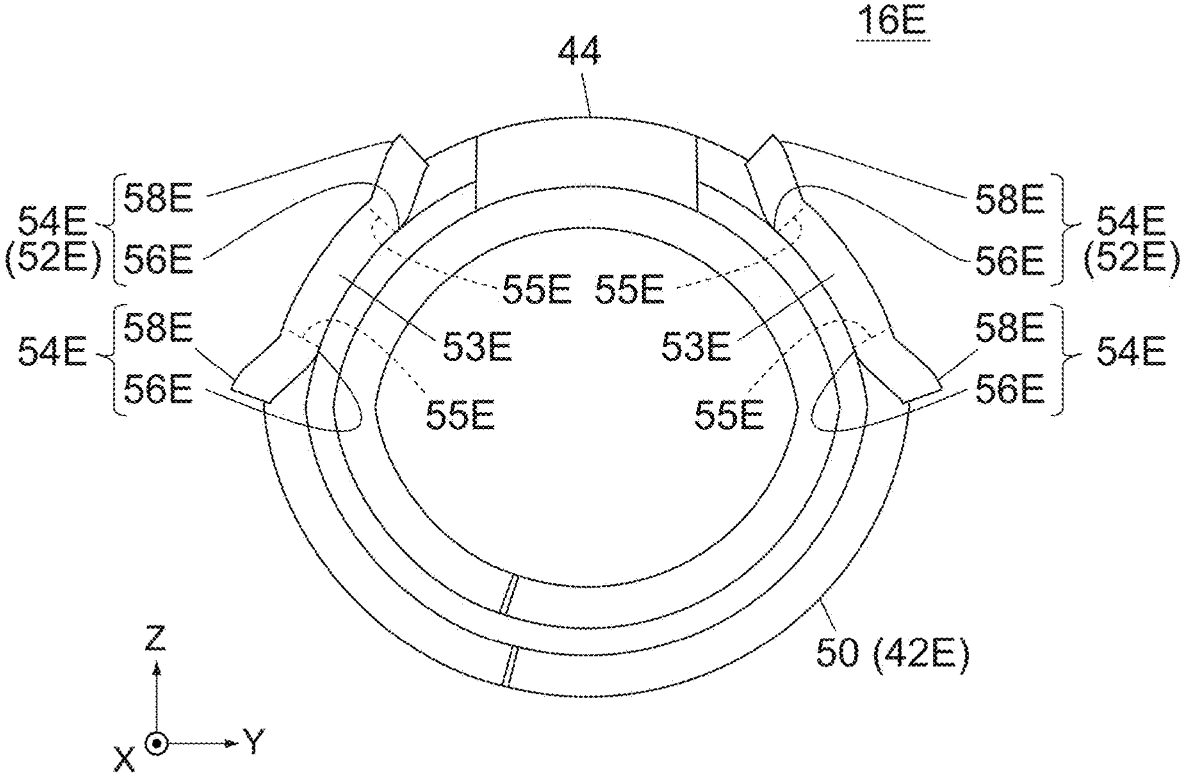
FIG. 23 is a front view showing the sleeve of FIG. 21, wherein boundaries between a first portion and second portions of each of projecting portions are illustrated with dashed line.

Referring to FIG. 23 together with FIG. 22, the projecting portion 52E of the present modification has a first portion 53E and two second portions 54E. The first portion 53E extends forward from the main portion 50. Each of the second portions 54E is connected to the first portion 53E and extends outward away from the main portion 50 in the perpendicular plane (YZ-plane). The two second portions 54E extend away from each other in the perpendicular plane.

Each of the second portions 54E has a bent portion 56E and a stopper 58E. Thus, the projecting portion 52E of the present modification has the two bent portions 56E and the two stoppers 58E.

Each of the second portions 54E is connected to the first portion 53E at a boundary 55E. The two boundaries 55E are located at opposite edges of a front end portion of the first portion 53E in the lateral direction, respectively. Each of the bent portions 56E is connected to the boundary 55E and is bent outward away from the main portion 50 in the perpendicular plane (YZ-plane). Each of the stoppers 58E is connected to the bent portion 56E and is located outward of the main portion 50 in the perpendicular plane.

Figure 24:
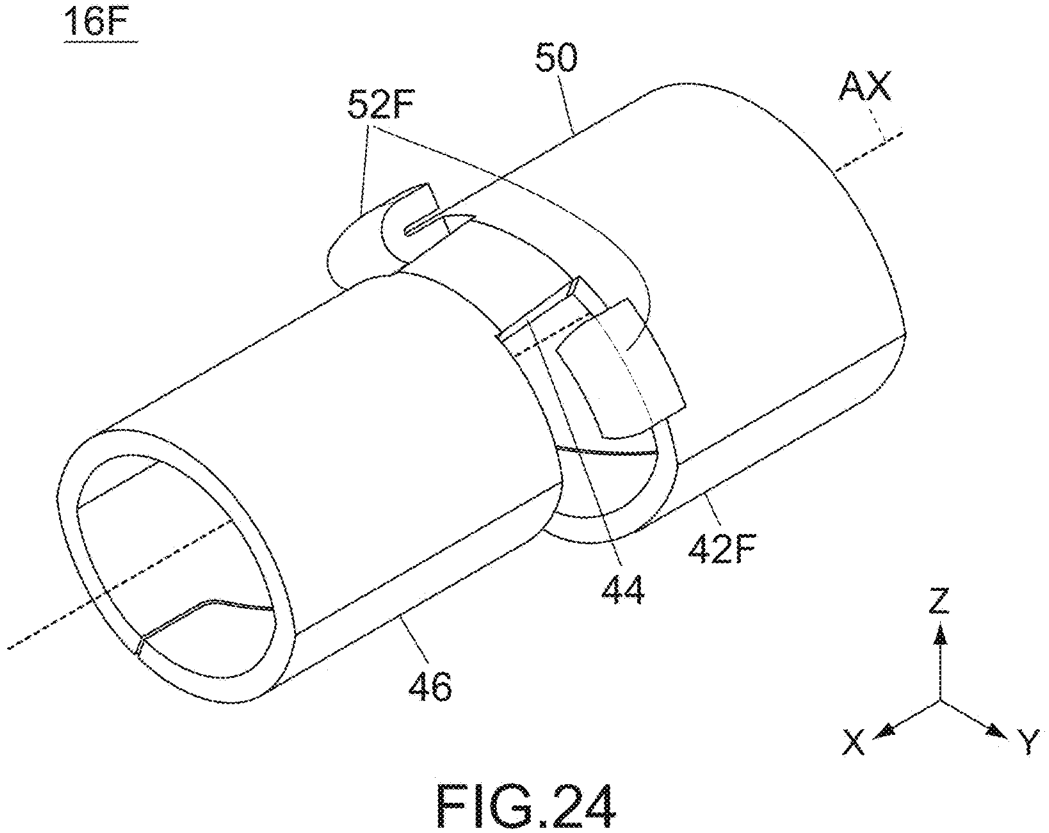
FIG. 24 is a perspective view showing a sixth modification of the sleeve of the connector of FIG. 4, wherein the imaginary center axis of the connector is illustrated with dashed line.

Referring to FIG. 24, a sleeve 16F according to a sixth modification has the main portion 50 and two projecting portions 52F. The sleeve 16F has the structure same as that of the sleeve 16 (see FIG. 4) except for the projecting portions 52F. The main portion 50 and the projecting portions 52F are provided on a first sleeve 42F. The two projecting portions 52F are located at opposite sides of the coupling portion 44 in the lateral direction, respectively, and have a symmetric shape with respect to the predetermined plane (XZ-plane). Hereafter, explanation will be made about one of the projecting portions 52F. The explanation described below is applicable to a remaining one of the projecting portions 52F.

Figure 25:
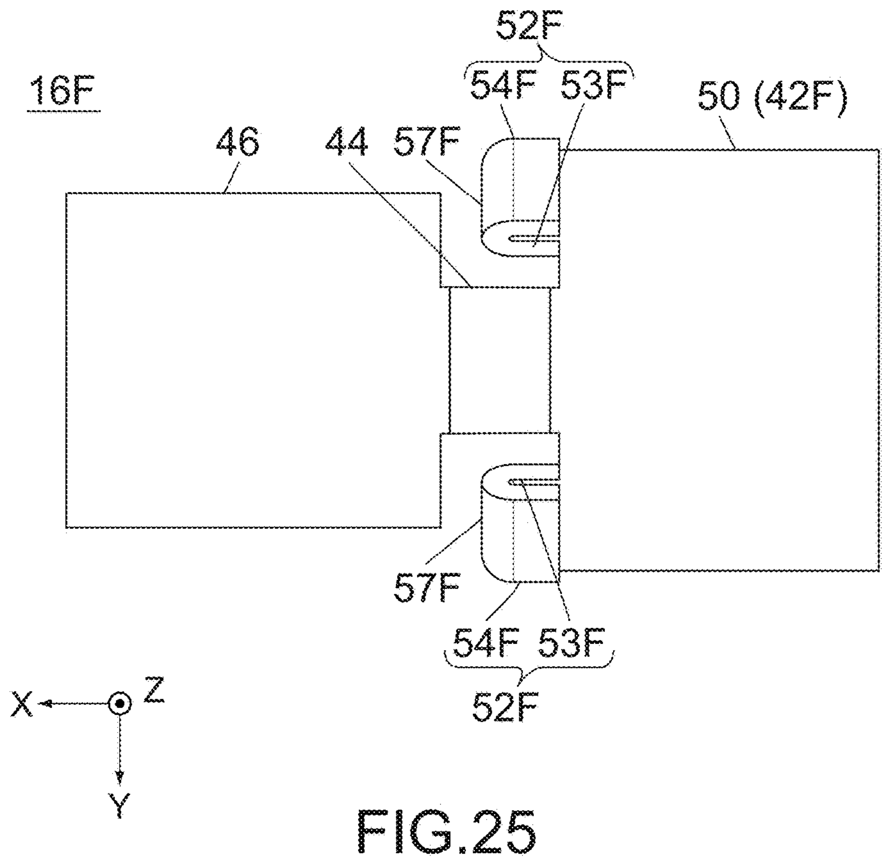
FIG. 25 is a top view showing the sleeve of FIG. 24.
Figure 26:
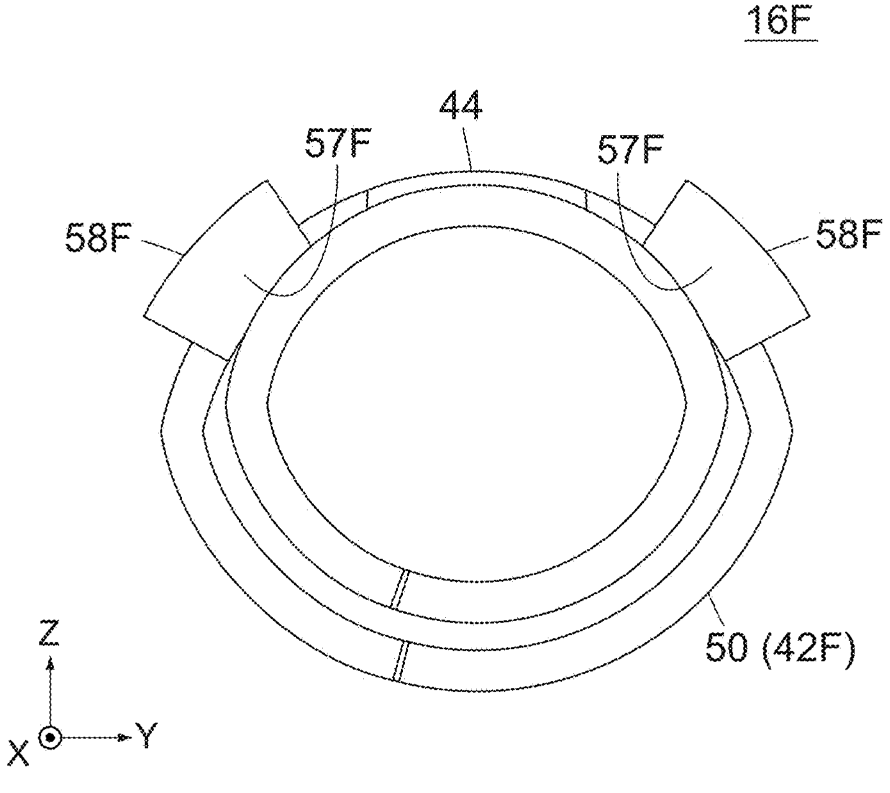
FIG. 26 is a front view showing the sleeve of FIG. 24.

Referring to FIG. 26 together with FIG. 25, the projecting portion 52F of the present modification has a first portion 53F and a second portion 54F. The first portion 53F extends forward from the main portion 50. The second portion 54F is connected to the first portion 53F and extends outward away from the main portion 50 in the perpendicular plane (YZ-plane). The second portion 54F has a folded portion 57F and a stopper 58F. Thus, the projecting portion 52F of the present modification has the folded portion 57F and the stopper 58F.

The folded portion 57F is connected to a front end of the first portion 53F and is located at a front end of the projecting portion 52F. The folded portion 57F is folded back. In detail, the folded portion 57F is folded into an arc so that it is away outward from the main portion 50 in the perpendicular plane (YZ-plane). The stopper 58F is located outward of the main portion 50 in the perpendicular plane and extends rearward from a rear end of the folded portion 57F to the front end of the main portion 50.

Figure 27:
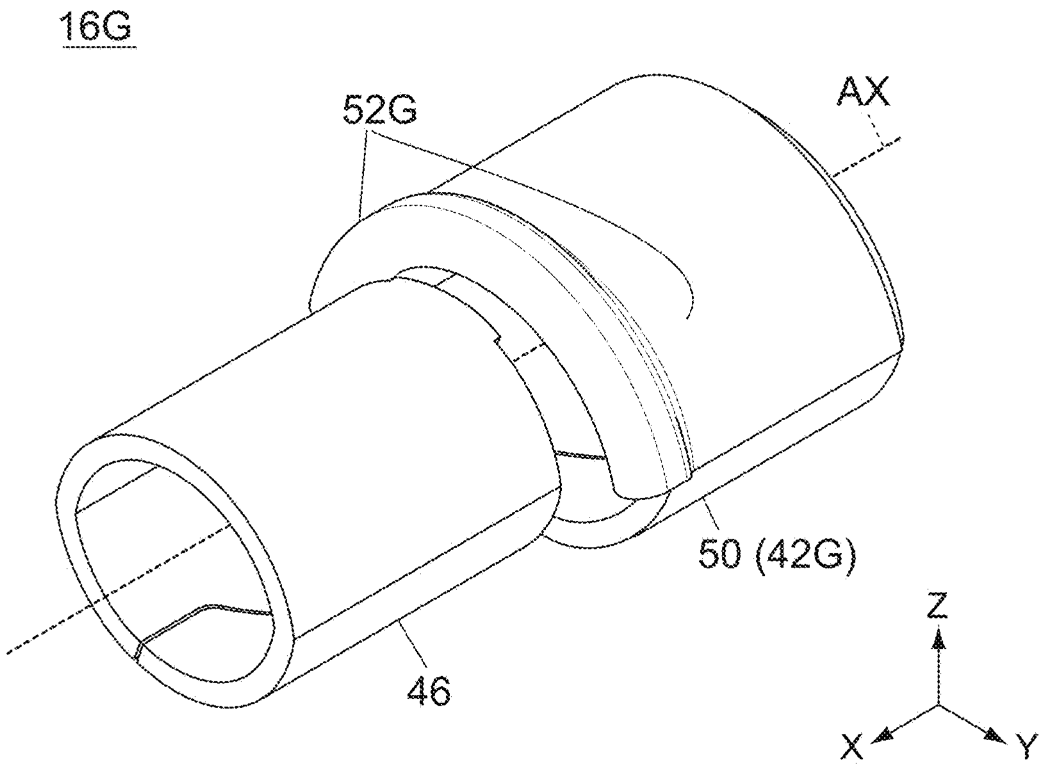
FIG. 27 is a perspective view showing a seventh modification of the sleeve of the connector of FIG. 4, wherein the imaginary center axis of the connector is illustrated with dashed line.

Referring to FIG. 27, a sleeve 16G according to a seventh modification has the main portion 50 and one projecting portion 52G. The sleeve 16G has a first sleeve 42G and the second sleeve 46 but does not have the coupling portion 44 (see FIG. 4). Thus, the first sleeve 42G and the second sleeve 46 are members separated from each other. The sleeve 16G has the structure same as that of the sleeve 16 (see FIG. 4) except for the aforementioned differences. The main portion 50 and the projecting portion 52G are provided on the first sleeve 42G.

Figure 28:
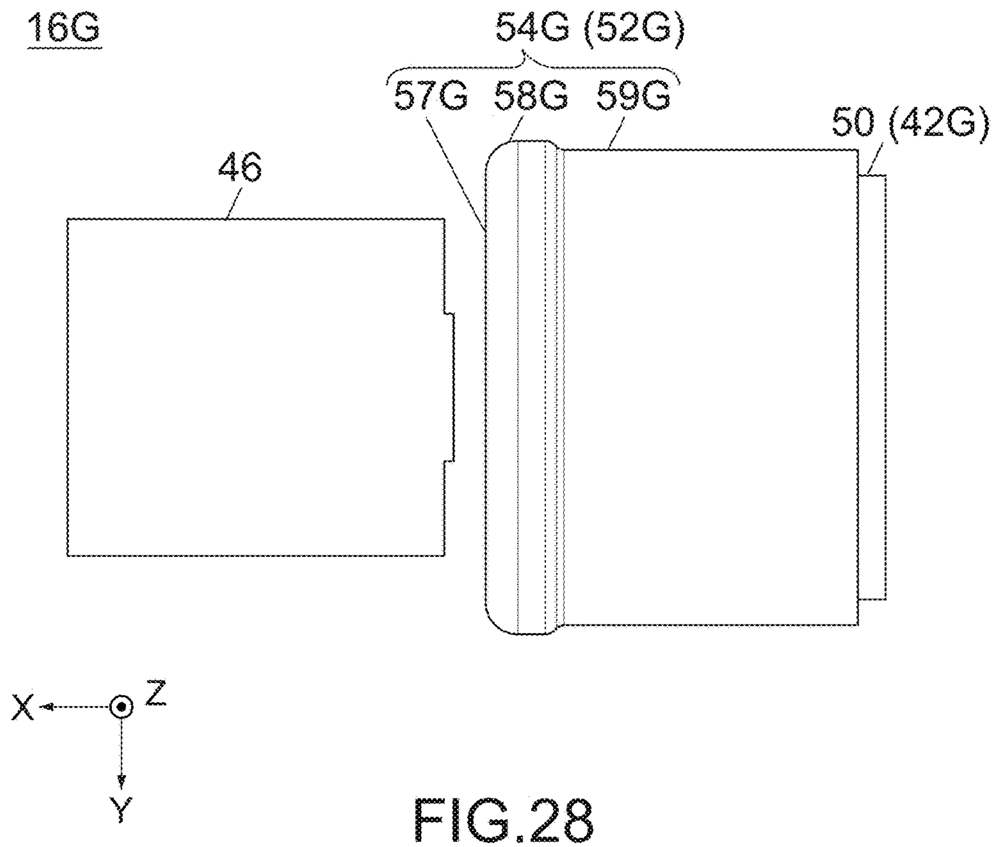
FIG. 28 is a top view showing the sleeve of FIG. 27.
Figure 29:
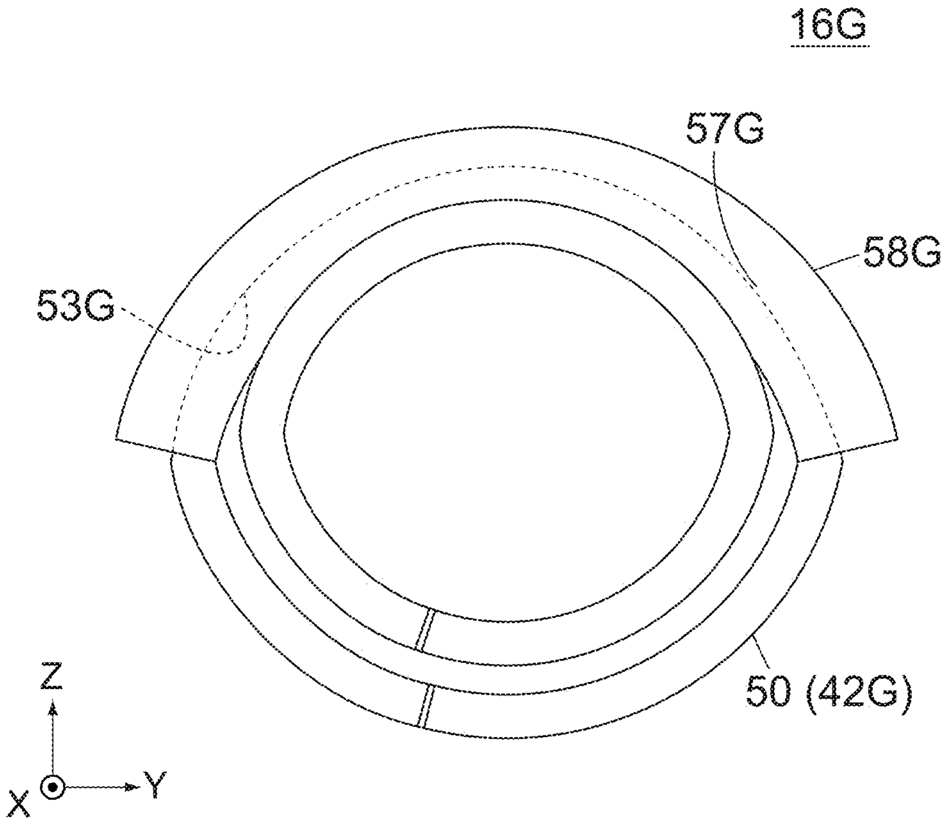
FIG. 29 is a front view showing the sleeve of FIG. 27, wherein a position of an upper end of a hidden first portion of a projecting portion is illustrated with dashed line.
Figure 30:
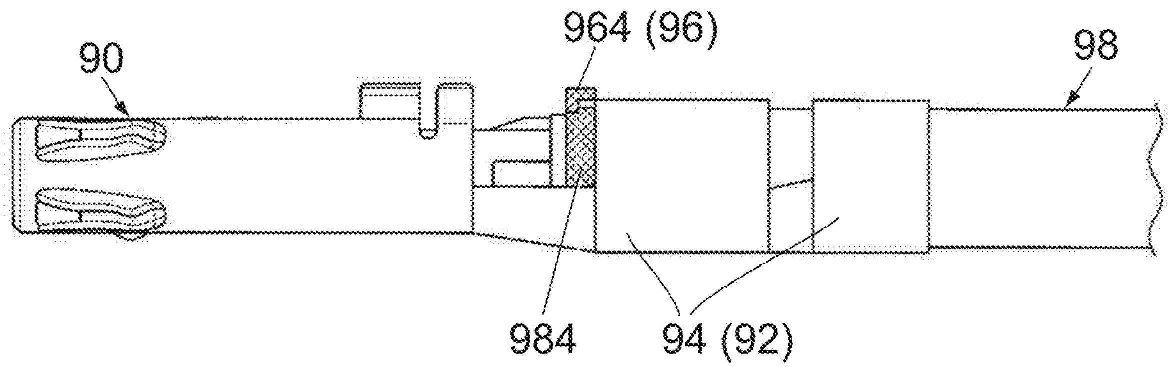
FIG.30 PRIOR ART
FIG. 30 is a side view showing a cable connector of Patent Document 1.
Figure 31:
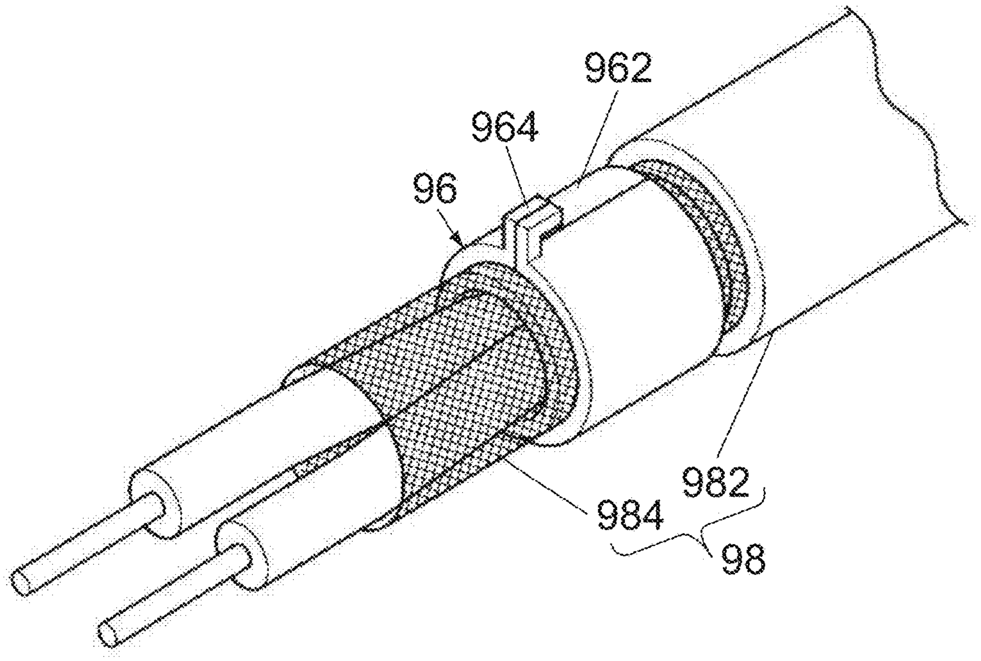
FIG.31 PRIOR ART
FIG. 31 is a perspective view showing the cable connector of FIG. 30, wherein a sleeve of the cable connector is crimped onto a cable.
Figure 32:
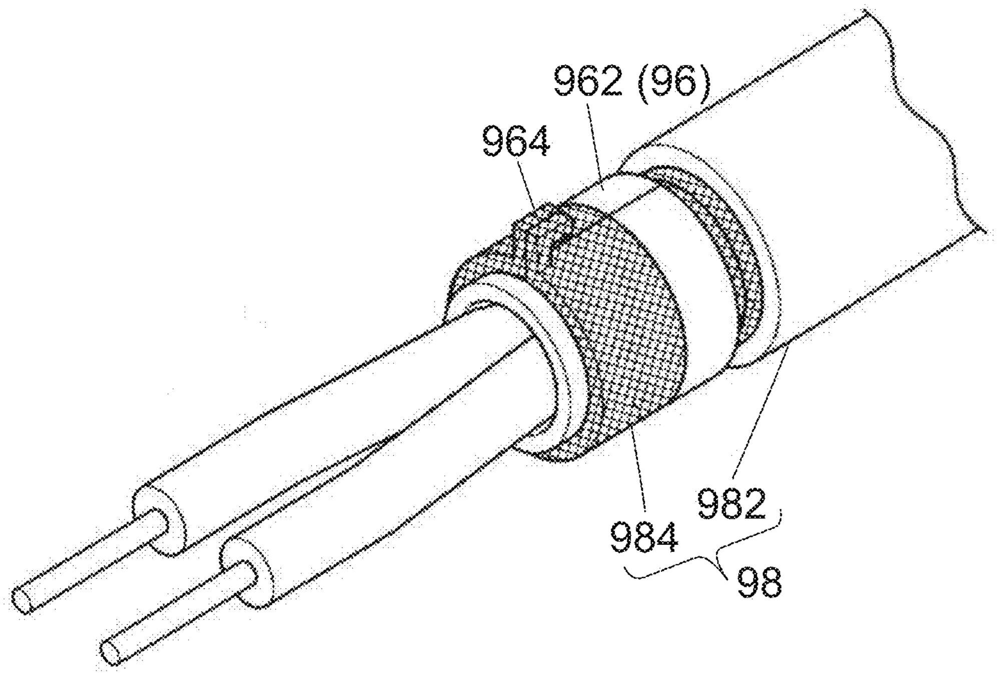
FIG.32 PRIOR ART
FIG. 32 is a perspective view showing the cable connector of FIG. 31, wherein a braid of the cable is folded back over the sleeve.

Referring to FIG. 28 together with FIG. 29, the projecting portion 52G of the present modification has a first portion 53G and a second portion 54G. The first portion 53G extends forward from the main portion 50. The second portion 54G is connected to the first portion 53G and extends outward away from the main portion 50 in the perpendicular plane (YZ-plane). The second portion 54G has a folded portion 57G, a stopper 58G and an extending portion 59G. Thus, the projecting portion 52G of the present modification has the folded portion 57G, the stopper 58G and the extending portion 59G.

The folded portion 57G is connected to a front end of the first portion 53G and is located at a front end of the projecting portion 52G. The folded portion 57G is folded back. In detail, the folded portion 57G is folded into an arc so that it is away outward from the main portion 50 in the perpendicular plane (YZ-plane). The stopper 58G is located outward of the main portion 50 in the perpendicular plane. The stopper 58G extends rearward from a rear end of the folded portion 57G to the front end of the main portion 50 while protruding outward in an arc in the perpendicular plane. The extending portion 59G extends rearward from a rear end of the stopper 58G and partially covers the main portion 50 in the perpendicular plane.

Referring to FIG. 27 together with FIG. 6, according to the present modification, the first barrel 32 is configured to be crimped onto the main portion 50 and the extending portion 59G. When the connector 12 is under the attached state, the barrel 32 encloses the main portion 50 in the perpendicular plane (YZ-plane) and is fixed to both the main portion 50 and the extending portion 59G. The stopper 58G is located forward of the barrel 32 and is located outward of both the main portion 50 and the extending portion 59G in the perpendicular plane. The thus-formed stopper 58G can reduce the displacement of the sleeve 16G.

Although various modifications are described above, the present invention is not limited thereto. The modifications described above can be variously modified and combined similarly to the previously described embodiment.

What is claimed is:

1. A connector configured to be attached to a front end of a cable in a front-rear direction, wherein:
- the connector comprises a connector body and a sleeve;
- the connector body has a body and a barrel;
- the barrel is located rearward of the body;
- the sleeve has a main portion and a projecting portion;
- when the connector is under an attached state where the connector is attached to the cable, the main portion encloses the cable in a perpendicular plane perpendicular to the front-rear direction and is fixed to the cable;
- the projecting portion extends forward from the main portion and has a stopper;
- the stopper is located forward of the main portion;
- the stopper is located outward of the main portion in the perpendicular plane when the connector is under the attached state; and
- when the connector is under the attached state, the barrel encloses the main portion in the perpendicular plane and is fixed to the main portion, and the stopper is located forward of the barrel.

2. The connector as recited in claim 1, wherein the projecting portion is located only forward of a front end of the main portion.

3. The connector as recited in claim 1, wherein:
- the cable comprises a braid and a sheath;
- the sleeve includes a first sleeve and a second sleeve;
- when the connector is under the attached state, the first sleeve encloses the sheath and is fixed to the sheath, and the second sleeve encloses the braid and is fixed to the braid; and
- the main portion and the projecting portion are provided on the first sleeve.

4. The connector as recited in claim 3, wherein:
- the sleeve has a coupling portion;
- the coupling portion couples the first sleeve and the second sleeve together; and
- the second sleeve is located forward of the first sleeve.

5. The connector as recited in claim 1, wherein the projecting portion has a bent portion.

6. The connector as recited in claim 1, wherein the projecting portion has a folded portion.

7. The connector as recited in claim 6, wherein the folded portion is located at a front end of the projecting portion.

8. The connector as recited in claim 1, wherein:

the projecting portion has a first portion and a second portion;

the first portion extends forward from the main portion;

the second portion is connected to the first portion and extends away from the main portion in the perpendicular plane; and the second portion has the stopper.

9. The connector as recited in claim 1, wherein:

the projecting portion has a first portion and two second portions;

the first portion extends forward from the main portion;

each of the second portions is connected to the first portion and extends away from the main portion in the perpendicular plane; and the two second portions extend away from each other in the perpendicular plane; and each of the second portions has the stopper.

10. A cable connector comprising a connector and a cable, wherein:

the connector is attached to a front end of the cable in a front-rear direction;

the connector comprises a connector body and a sleeve;

the connector body has a body and a barrel;

the barrel is located rearward of the body;

the sleeve has a main portion and a projecting portion;

the main portion encloses the cable in a perpendicular plane perpendicular to the front-rear direction and is fixed to the cable;

the projecting portion extends forward from the main portion and has a stopper;

the stopper is located forward of the main portion and is located outward of the main portion in the perpendicular plane;

the barrel encloses the main portion in the perpendicular plane and is fixed to the main portion, and;

the stopper is located forward of the barrel.

* * * * *